(12) United States Patent
Chang et al.

(10) Patent No.: US 7,737,316 B2
(45) Date of Patent: Jun. 15, 2010

(54) METHOD OF FLOCCULATION AND FORMULATION OF CRYSTALLINE MATERIALS

(75) Inventors: Yun-Feng Chang, Houston, TX (US); Daria N. Lissy, Glen Mills, PA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1036 days.

(21) Appl. No.: 11/453,154

(22) Filed: Jun. 14, 2006

(65) Prior Publication Data

US 2006/0293176 A1    Dec. 28, 2006

Related U.S. Application Data

(60) Provisional application No. 60/693,754, filed on Jun. 24, 2005.

(51) Int. Cl.
C07C 1/00 (2006.01)
B01J 27/182 (2006.01)

(52) U.S. Cl. .................... 585/640; 585/639; 502/208; 502/214

(58) Field of Classification Search .................. None
See application file for complete search history.

(56) References Cited

U.S. PATENT DOCUMENTS

| | | | |
|---|---|---|---|
| 3,804,781 A * | 4/1974 | Colgan | ............... 502/439 |
| 4,062,905 A | 12/1977 | Chang et al. | |
| 4,079,095 A | 3/1978 | Givens et al. | |
| 4,310,440 A | 1/1982 | Wilson et al. | |
| 4,440,871 A | 4/1984 | Lok et al. | |
| 5,367,100 A | 11/1994 | Gongwei et al. | |

(Continued)

FOREIGN PATENT DOCUMENTS

WO    WO 03/000412    1/2003

(Continued)

OTHER PUBLICATIONS

U.S. Appl. No. 11/109,397.

(Continued)

*Primary Examiner*—In Suk Bullock
(74) *Attorney, Agent, or Firm*—Kevin M. Faulkner; David M. Weisberg

(57) ABSTRACT

A method for determining an amount of flocculant effective to recover a molecular sieve crystalline product that comprises the steps of (a) preparing a molecular sieve crystalline product mixture; (b) separating the molecular sieve crystalline product mixture into a plurality of samples; (c) mixing at least two of the plurality of samples with a quantity of flocculant to produce a plurality of flocculated samples, wherein at least two of the plurality of flocculated samples have a different ratio of flocculant to molecular sieve crystalline product mixture; (d) measuring the viscosity or zeta potential of at least two of the plurality of flocculated samples having a different ratio of flocculant to molecular sieve crystalline product mixture; (e) establishing a relationship between the quantity of flocculant and the viscosity or zeta potential measurements; and (f) determining from the relationship the amount of flocculant effective to recover the molecular sieve crystalline product.

19 Claims, 2 Drawing Sheets

U.S. PATENT DOCUMENTS

| | | |
|---|---|---|
| 6,403,855 B1 * | 6/2002 | Mertens ................ 585/640 |
| 6,503,863 B2 | 1/2003 | Fung et al. |
| 6,541,415 B2 | 4/2003 | Vaughn et al. |
| 6,660,682 B2 | 12/2003 | Cao et al. |
| 6,787,501 B2 | 9/2004 | Chang et al. |
| 2003/0181322 A1 | 9/2003 | Chang et al. |
| 2005/0065021 A1 * | 3/2005 | Chang et al. ............ 502/214 |
| 2005/0256354 A1 | 11/2005 | Martens et al. |

FOREIGN PATENT DOCUMENTS

| | | |
|---|---|---|
| WO | WO 03/000413 | 1/2003 |

OTHER PUBLICATIONS

U.S. Appl. No. 11/109,584.
U.S. Appl. No. 11/109,586.

* cited by examiner

METHOD OF FLOCCULATION AND FORMULATION OF CRYSTALLINE MATERIALS

CROSS REFERENCE TO RELATED APPLICATIONS

This application claims the benefit of Provisional Application No. 60/693,754, filed Jun. 24, 2005, the disclosure of which is fully incorporated herein by reference.

FIELD OF THE INVENTION

The present invention relates to a method of recovering crystalline materials. More particularly, the invention relates to a method of recovering crystalline materials by flocculation.

BACKGROUND OF THE INVENTION

Olefins are traditionally produced from petroleum feedstock by catalytic or steam cracking processes. These cracking processes, especially steam cracking, produce light olefin(s) such as ethylene and/or propylene from a variety of hydrocarbon feedstocks. Ethylene and propylene are important commodity petrochemicals useful in a variety of processes for making plastics and other chemical compounds.

The petrochemical industry has known that oxygenates, especially alcohols, are convertible into light olefin(s). There are numerous technologies available for producing oxygenates including fermentation or reaction of synthesis gas derived from natural gas, petroleum liquids, carbonaceous materials including coal, recycled plastics, municipal waste or any other organic material. Generally, the production of synthesis gas involves a combustion reaction of natural gas, mostly methane, and an oxygen source into hydrogen, carbon monoxide and/or carbon dioxide. Syngas production processes are well known, and include conventional steam reforming, autothermal reforming or a combination thereof.

Methanol, the preferred alcohol for light olefin production, is typically synthesized from the catalytic reaction of hydrogen, carbon monoxide and/or carbon dioxide in a reactor in the presence of a heterogeneous catalyst. For example, in one synthesis process methanol is produced using a copper/zinc oxide catalyst in a water-cooled tubular reactor. The preferred methanol conversion process is generally referred to as a methanol-to-olefin(s) process (MTO), where an oxygenate, typically mostly methanol, is converted into primarily ethylene and/or propylene in the presence of a molecular sieve.

There are many different types of molecular sieves well known to convert a feedstock, especially an oxygenate containing feedstock, into one or more olefin(s). Molecular sieves, such as zeolites or zeolite-type molecular sieves, carbons and oxides, are porous solids having pores of different sizes that selectively adsorb molecules that can enter the pores, and exclude other molecules that are too large. Examples of molecular sieves useful in converting an oxygenate into olefin(s) are U.S. Pat. No. 5,367,100 [describes the use of ZSM-5 to convert methanol into olefin(s)]; U.S. Pat. No. 4,062,905 (discusses the conversion of methanol and other oxygenates to ethylene and propylene using crystalline aluminosilicate zeolites, for example, Zeolite T, ZK5, erionite and chabazite); U.S. Pat. No. 4,079,095 (describes the use of ZSM-34 to convert methanol to hydrocarbon products such as ethylene and propylene); U.S. Pat. No. 4,310,440 (describes producing light olefin(s) from an alcohol using a crystalline aluminophosphates, often represented by $ALPO_4$); and U.S. Pat. No. 4,440,871 [describes silicoaluminophosphate molecular sieves (SAPO), one of the most useful molecular sieves for converting methanol into olefin(s)].

Typically, molecular sieves are formed into molecular sieve catalyst compositions to improve their durability in commercial conversion processes. The collisions within a commercial process between catalyst composition particles themselves, the reactor walls, and other reactor systems cause the particles to breakdown into smaller particles called fines. The physical breakdown of the molecular sieve catalyst composition particles is known as attrition. Problems develop in the recovery systems because fines often exit the reactor in the product containing effluent stream. Catalyst compositions having a higher resistance to attrition generate fewer fines; this results in improved process operability, and less catalyst composition being required for a conversion process, and therefore, lower overall operating costs.

It is known that the way in which the molecular sieve catalyst compositions are made or formulated affects catalyst composition attrition. Molecular sieve catalyst compositions are formed by combining a molecular sieve and a matrix material usually in the presence of a binder. For example, PCT Patent Publication WO 03/000413 A1, published Jan. 3, 2003 discloses a low attrition molecular sieve catalyst composition using a synthesized molecular sieve that has not been fully dried, or partially dried, in combination in a slurry with a binder and/or a matrix material. Also, PCT Patent Publication WO 03/000412 A1 published Jan. 3, 2003, discusses a low attrition molecular sieve catalyst composition produced by controlling the pH of the slurry away from the isoelectric point of the molecular sieve. U.S. Pat. No. 6,787,501 shows making a low attrition molecular sieve catalyst composition by making a slurry of a synthesized molecular sieve, a binder, and optionally a matrix material, wherein 90 percent by volume of the slurry contains particles having a diameter less than 20 µm. U.S. Patent Application Publication No. 2003/0181322, published Sep. 25, 2003, which is fully incorporated herein by reference, illustrates making an attrition resistant molecular sieve catalyst composition by controlling the ratio of a binder to a molecular sieve. U.S. Pat. No. 6,503,863 is directed to a method of heat treating a molecular sieve catalyst composition to remove a portion of the template used in the synthesis of the molecular sieve. U.S. Pat. No. 6,541,415 describes improving the attrition resistance of a molecular sieve catalyst composition that contains molecular sieve-containing recycled attrition particles and virgin molecular sieve. U.S. Pat. No. 6,660,682 describes the use of a polymeric base to reduce the amount of templating agent required to produce a particular molecular sieve.

It is also known that in typical commercial processes flocculants are used to facilitate the recovery of synthesized molecular sieves. Thus, without flocculants, the natural settling of the as-synthesized molecular sieve from the synthesis mixture may be too slow to be economically viable. In addition, the direct filtration of the synthesis mixture is often slow and inefficient because of the small crystal size of the as-synthesized molecular sieve and the presence of unconverted reactants and by-products that may also be small in size. Flocculants are therefore typically used to ensure faster and more complete settling of the as-synthesized molecular sieve from the synthesis mixture. However, the presence of excess flocculant can raise the viscosity of the synthesis mixture thereby making subsequent filtration more difficult. In addition, the presence of excess flocculant in the recovered molecular sieve can affect catalyst formulation, and in some cases can result in the formulation of catalyst compositions having lower attrition resistance, lower selectivity in various conversion processes, and high slurry viscosity. At present the determination of the amount of flocculant to be used in the recovery of molecular sieves involves a large amount of trial and error and hence there is a need for a method that facilitates the determination of optimal flocculant levels.

For an example of the use of flocculants in the recovery of molecular sieves, reference is directed to U.S. Patent Application Publication No. 2005/0256354, published Nov. 17, 2005, which claims a process for producing one or more olefin(s), comprising the steps of (a) introducing a feedstock to a reactor system in the presence of a molecular sieve catalyst composition comprising a synthesized molecular sieve having been recovered in the presence of a flocculant; (b) withdrawing from the reactor system an effluent stream; and (c) passing the effluent gas through a recovery system recovering at least the one or more olefin(s). See also, U.S. patent application Ser. No. 11/109,397, filed Apr. 19, 2005, which claims a catalyst composition comprising a non-over flocculated molecular sieve and an over flocculated molecular sieve. See also, U.S. patent application Ser. No. 11/109,584, filed Apr. 19, 2005, which claims a catalyst composition comprising an over flocculated molecular sieve and a phosphorous compound. See also, U.S. patent application Ser. No. 11/109,586, filed Apr. 19, 2005, which claims a catalyst composition prepared by the process comprising (a) combining: (i) an over flocculated molecular sieve; (ii) a binder; and (iii) optionally, a matrix material to form a catalyst slurry; and (b) milling the catalyst slurry.

SUMMARY OF THE INVENTION

This invention generally provides a method of recovering a crystalline product, preferably a zeolite or molecular sieve, more preferably a molecular sieve. More particularly, this invention provides a method of quantitatively determining the optimal level of flocculant necessary to recover the crystalline product so that a subsequently formulated product slurry has a processable viscosity and a subsequently formulated catalyst has a good attrition resistance. In one embodiment, the invention comprises a method of quantitatively determining the amount of flocculant required to recover a crystalline product.

In one embodiment, the invention is directed toward a method for determining an amount of flocculant effective to recover a molecular sieve crystalline product, the method comprising: (a) preparing a molecular sieve product mixture, the molecular sieve product mixture comprising: (i) the molecular sieve crystalline product, (ii) a binder, and (iii) optionally a matrix material; (b) separating the molecular sieve product mixture into a plurality of samples; (c) mixing at least two of the plurality of samples with a quantity of flocculant to produce a plurality of flocculated samples, wherein at least two of the plurality of flocculated samples have a different ratio of flocculant to molecular sieve crystalline product mixture; (d) measuring the viscosity of at least two of the plurality of flocculated samples having a different ratio of flocculant to molecular sieve crystalline product mixture; (e) establishing a relationship between the quantity of flocculant and the viscosity measurements; and (f) determining from the relationship the amount of flocculant effective to recover the molecular sieve crystalline product resulting in a processable molecular sieve crystalline product slurry. An effective amount of flocculant is an amount that can be tolerated in the flocculated product that will not cause processing difficulties. The above embodiment can be combined with any of the embodiments out-lined below.

In another embodiment, the molecular sieve crystalline product is prepared by the steps comprising: synthesizing a molecular sieve crystalline product synthesis mixture, the synthesis mixture comprising: an aluminum source and a silicon source, and optionally a phosphorous source; and recovering the molecular sieve crystalline product from the molecular sieve crystalline product synthesis mixture by a recovery means selected from the group consisting of centrifugation, filtration, filterpressing, washing, settling, and any other means of mechanically enhancing separation.

In another embodiment, the method for determining an amount of flocculant effective to recover a molecular sieve crystalline product further comprises measuring the viscosity of one of the plurality of samples, the sample being substantially flocculant-free.

In another embodiment, the method for determining an amount of flocculant effective to recover a molecular sieve crystalline product further comprises the step of: scaling the determined amount of flocculant effective to recover the molecular sieve crystalline product to produce about 5,000 kg of the processable molecular sieve crystalline product. In another embodiment, the method for determining an amount of flocculant effective to recover a molecular sieve crystalline product further comprises the step of: adjusting the determined amount of flocculant effective to recover the molecular sieve crystalline product by a correction factor of about 0.75, preferably about 0.80, more preferably about 0.85, even more preferably about 0.90, most preferably about 0.95, and even most preferably about 0.98.

In another embodiment, the molecular sieve crystalline product is recovered at a recovery rate of from about 0.5 kg/hr to about 5,000 kg/hr. In another embodiment, the recovery rate is increased by about 0.5 kg/hr to about 5 kg/hr by using the effective amount of flocculant in combination with the recovery means selected from the group consisting of centrifugation, filtration, filterpressing, washing, settling, and any other means of mechanically enhancing separation.

In another embodiment, the molecular sieve crystalline product is selected from one or more of the group consisting of: a metalloaluminophosphate, a silicoaluminophosphate, an aluminophosphate, a CHA framework-type molecular sieve crystalline product, an AEI framework-type molecular sieve crystalline product and a CHA and AEI intergrowth or mixed framework-type molecular sieve crystalline product. In another embodiment, the flocculant has an average molecular weight of about 500 to about 50,000,000. In another embodiment, the binder is selected from one or more of the group consisting of aluminum chlorohydrate, aluminum hydroxy chloride, aluminum zirconium chlorohydrate, aluminum sol, silica sol, aluminum silica sol, or a combination thereof. In another embodiment, the matrix material is selected from one or more of the group consisting of kaolin clay, chemically treated kaolin clay, metal oxides selected from $M_2O_3$, $SiO_2$, or other sinter resistant metal oxides. In another embodiment, the processable molecular sieve crystalline product forms a molecular sieve slurry having a viscosity of less than about 10,000 cps, preferably less than about 9,000 cps, more preferably less than about 8,000 cps, and most preferably less than about 7,000 cps.

In another embodiment, the relationship is established by a computer. In another embodiment, the amount of flocculant effective to recover the molecular sieve crystalline product is from about 20 ppm to about 10 wt % flocculant based on expected solid molecular sieve product yield. The amount of flocculant required for a given sieve is not only determined by the amount of sieve in the system, but also by crystal size, morphology, the presence of nano particles and the ionicity of the medium.

In another embodiment, the invention is directed to a molecular sieve catalyst produced by the method for determining an amount of flocculant effective to recover a molecular sieve crystalline product while not causing formulation difficulties. In another embodiment, the invention is directed to a process for producing one or more olefin(s), including ethylene and propylene, the process comprising: (a) introducing a feedstock comprising one or more oxygenates, such as methanol, to a reactor system in the presence of the molecular sieve catalyst produced by the method for determining an amount of flocculant effective to recover a molecular sieve crystalline product while not causing formulation difficulties; (b) withdrawing from the reactor system an effluent stream; and (c) passing the effluent stream through a recovery system recovering the one or more olefin(s). In another embodiment, the process further comprises the steps of: passing a hydrocarbon feedstock to a syngas production zone to produce a synthesis gas stream; and contacting the synthesis gas stream with a catalyst to form the feedstock comprising one or more oxygenates. In another embodiment, the process further comprises the step of: polymerizing the one or more olefin(s) in the presence of a polymerization catalyst into a polyolefin.

In a further embodiment, the invention is directed toward a method for determining an amount of flocculant effective to recover a molecular sieve crystalline product, the method comprising: (a) preparing a molecular sieve product mixture comprising: the molecular sieve crystalline product; (b) separating the molecular sieve product mixture into a plurality of samples; (c) mixing one or more of the samples with flocculant to produce at least two test samples have different ratios of flocculant to molecular sieve crystalline product mixture; (d) measuring the zeta potential of said at least two test samples; (e) establishing a relationship between the quantity of flocculant and the zeta potential measurements; and (f) determining from the relationship the amount of flocculant effective to recover the molecular sieve crystalline product.

DETAILED DESCRIPTION OF THE INVENTION

Introduction

Figure 1:
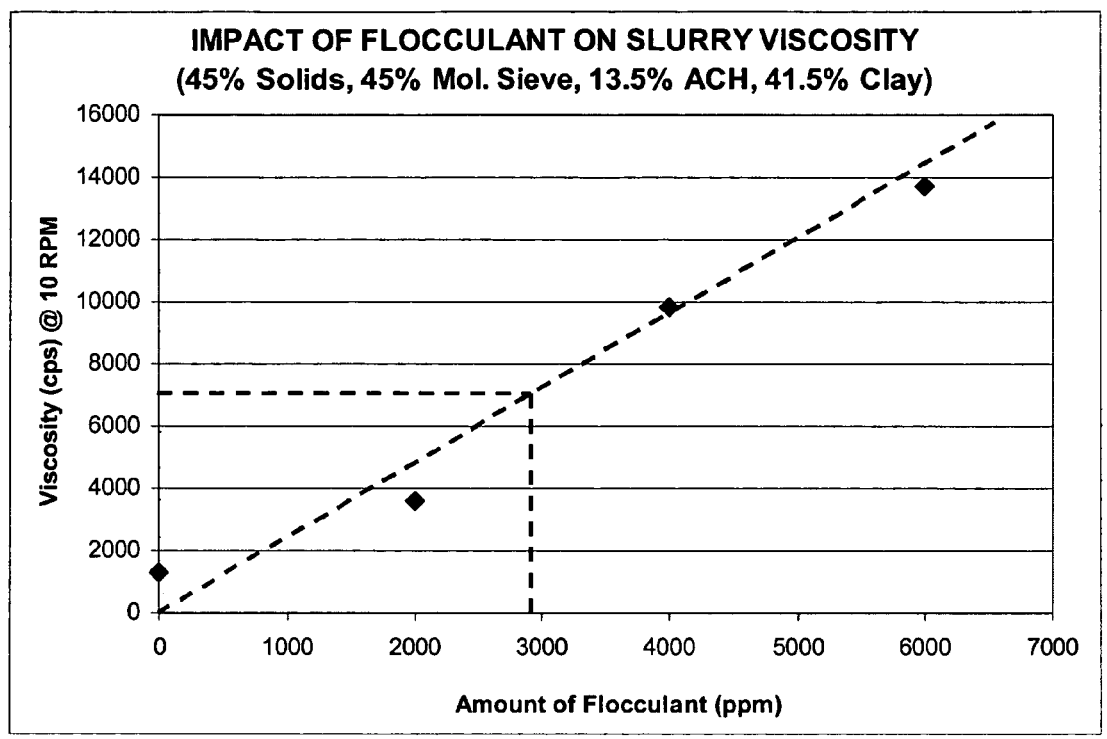
FIG. 1 is a graph illustrating the relationship between the viscosity of a molecular sieve crystalline product slurry and the amount of flocculant added to the slurry.

The invention is directed toward a method of recovering a crystalline product using non-mechanical means, resulting in a processable product slurry and a catalyst with good attrition resistance.

A molecular sieve crystalline product is typically formed from the combination of a molecular sieve, a binder, and optionally, most preferably, a matrix material. In order to recover this molecular sieve crystalline product, either gravitational means or mechanical means are used. It has been discovered that the presence of an amount of flocculant, allows for quick and easy recovery. An excess amount of flocculant will result in poor processability of the resulting molecular sieve crystalline slurry and filtration problems. Therefore, it has been discovered that by using the method disclosed herein an effective amount of flocculant can be determined that will allow for recovery of the molecular sieve crystalline product, resulting in a processable molecular sieve crystalline slurry and a resulting catalyst composition with good attrition resistance.

Molecular Sieves

Molecular sieves have various chemical, physical, and framework characteristics. Molecular sieves have been well classified by the Structure Commission of the International Zeolite Association (IZA) according to the rules of the IUPAC Commission on Zeolite Nomenclature. A framework-type describes the connectivity, topology, of the tetrahedrally coordinated atoms constituting the framework, and making an abstraction of the specific properties for those materials. Framework-type zeolite and zeolite-type molecular sieves for which a structure has been established, are assigned a three letter code and are described in the *Atlas of Zeolite Framework Types*, 5th edition, Elsevier, London, England (2001), which is fully incorporated herein by reference. For additional information on molecular sieve types, structures and characteristics, see van Bekkum, et al., *Introduction to Zeolite Science and Practice, Second Completely Revised and Expanded Edition*, Volume 137, Elsevier Science, B. V., Amsterdam, Netherlands (2001), which is also fully incorporated herein by reference.

Non-limiting examples of these molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves include ANA, BEA, CFI, CLO, DON, GIS, LTL, MER, MOR, MWW, and SOD. Non-limiting examples of the preferred molecular sieves, particularly for converting an oxygenate containing feedstock into olefin(s), include AEI, AEL, AFY, BEA, CHA, EDI, FAU, FER, GIS, LTA, LTL, MER, MFI, MOR, MTT, MWW, TAM, and TON. In one preferred embodiment, the molecular sieve of the invention has an AEI topology or a CHA topology, or a combination thereof, most preferably an intergrowth thereof.

The small, medium and large pore molecular sieves have from a 4-ring to a 12-ring or greater framework-type. In a preferred embodiment, the molecular sieves have 8-, 10- or 12-ring structures or larger and an average pore size in the range of about 3 Å to 15 Å. In the most preferred embodiment, the molecular sieves, preferably SAPO molecular sieves, have 8 rings and an average pore size less than or equal to about 5 Å, preferably in the range of from 3 Å to about 5 Å, more preferably from 3 Å to about 4.5 Å, and most preferably from 3.5 Å to about 4.2 Å.

Molecular sieves based on silicon, aluminum, and phosphorous, and metal containing molecular sieves thereof, have been described in detail in numerous publications including for example, U.S. Pat. No. 4,567,029 (MeAPO where Me is Mg, Mn, Zn, or Co) and U.S. Pat. No. 4,440,871 (SAPO), European Patent Application EP-A-0 159 624 (ELAPSO where El is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683,217, and 4,744,885 (FeAPSO), EP-A-0 158 975 and U.S. Pat. No. 4,935,216 (ZnAPSO, EP-A-0 161 489 (CoAPSO), EP-A-0 158 976 (ELAPO, where EL is Co, Fe, Mg, Mn, Ti or Zn), U.S. Pat. No. 4,310,440 (AlPO$_4$), EP-A-0

158 350 (SENAPSO), U.S. Pat. No. 4,973,460 (LiAPSO); U.S. Pat. No. 4,789,535 (LiAPO); U.S. Pat. No. 4,992,250 (GeAPSO); U.S. Pat. No. 4,888,167 (GeAPO); U.S. Pat. No. 5,057,295 (BAPSO); U.S. Pat. No. 4,738,837 (CrAPSO); U.S. Pat. Nos. 4,759,919; 4,851,106 (CrAPO); U.S. Pat. Nos. 4,758,419; 4,882,038; 5,434,326; 5,478,787 (MgAPSO), U.S. Pat. No. 4,554,143 (FeAPO); U.S. Pat. No. 4,894,213 (AsAPSO); U.S. Pat. No. 4,913,888 (AsAPO); U.S. Pat. Nos. 4,686,092; 4,846,956; 4,793,833 (MnAPSO); U.S. Pat. Nos. 5,345,011; 6,156,931 (MnAPO); U.S. Pat. No. 4,737,353 (BeAPSO); U.S. Pat. No. 4,940,570 (BeAPO); U.S. Pat. Nos. 4,801,309; 4,684,617; 4,880,520 (TiAPSO); U.S. Pat. Nos. 4,500,651; 4,551,236; 4,605,492 (TiAPO); U.S. Pat. Nos. 4,824,554; 4,744,970 (CoAPSO); and U.S. Pat. No. 4,735,806 (GaAPSO); EP-A-0 293 937 (QAPSO, where Q is framework oxide unit [QO₂]), as well as U.S. Pat. Nos. 4,567,029; 4,686,093; 4,781,814; 4,793,984; 4,801,364, 4,853,197; 4,917,876; 4,952,384; 4,956,164; 4,956,165; 4,973,785; 5,098,684 (MCM-41); U.S. Pat. No. 5,198,203 (MCM-48); U.S. Pat. Nos. 5,241,093; 5,304,363 (MCM-50); U.S. Pat. Nos. 5,493,066; 5,675,050; 6,077,498 (ITQ-1); U.S. Pat. No. 6,409,986 (ITQ-5); U.S. Pat. No. 6,419,895 (UZM-4); U.S. Pat. No. 6,471,939 (ITQ-12); U.S. Pat. No. 6,471,941 (ITQ-13); U.S. Pat. No. 6,475,463 (SSZ-55); U.S. Pat. No. 6,500,404 (ITQ-3); U.S. Pat. No. 6,500,998 (UZM-5 and UZM-6); U.S. Pat. No. 6,524,551 (MCM-58); U.S. Pat. No. 6,544,495 (SSZ-57); U.S. Pat. No. 6,547,958 (SSZ-59); U.S. Pat. No. 6,555,090 (ITQ-36); and U.S. Pat. No. 6,569,401 (SSZ-64), all of which are fully incorporated herein by reference. Other molecular sieves are described in R. Szostak, *Handbook of Molecular Sieves*, Van Nostrand Reinhold, New York, N.Y. (1992), which is fully incorporated herein by reference.

The more preferred silicon, aluminum and/or phosphorous containing molecular sieves, and aluminum, phosphorous, and optionally silicon, containing molecular sieves include aluminophosphate (ALPO) molecular sieves and silicoaluminophosphate (SAPO) molecular sieves and substituted, preferably metal substituted, ALPO and SAPO molecular sieves. The most preferred molecular sieves are SAPO molecular sieves, and metal substituted SAPO molecular sieves.

In one embodiment, the molecular sieve, as described in many of the U.S. Patents mentioned above, is represented by the empirical formula, on an anhydrous basis:

$$mR:(M_xAl_yP_z)O_2$$

wherein R represents at least one templating agent, preferably an organic templating agent; m is the number of moles of R per mole of $(M_xAl_yP_z)O_2$ and m has a value from 0 to 1, preferably from 0 to 0.5, and most preferably from 0 to 0.3; x, y, and z represent the mole fraction of Al, P and M as tetrahedral oxides, where M is a metal selected from one of Group IA, IIA, IB, IIIB, IVB, VB, VIB, VIIB, VIIIB and Lanthanide's of the Periodic Table of Elements, preferably M is selected from one of the group consisting of Co, Cr, Cu, Fe, Ga, Ge, Mg, Mn, Ni, Si, Ti, Zn and Zr. In an embodiment, m is greater than or equal to 0.2, and x, y and z are greater than or equal to 0.01. In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Synthesis of a molecular sieve, especially a SAPO molecular sieve, its formulation into a SAPO catalyst, and its use in converting a hydrocarbon feedstock into olefin(s), is shown in, for example, U.S. Pat. Nos. 4,499,327; 4,677,242; 4,677,243; 4,873,390; 5,095,163; 5,714,662; and 6,166,282, all of which are fully incorporated herein by reference. Non-limiting examples of SAPO and ALPO molecular sieves for use in the present method include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44 (U.S. Pat. No. 6,162,415), SAPO-47, SAPO-56, ALPO-5, ALPO-11, ALPO-18, ALPO-31, ALPO-34, ALPO-36, ALPO-37, ALPO-46, and metal containing molecular sieves thereof. The more preferred molecular sieves include one or a combination of SAPO-18, SAPO-34, SAPO-35, SAPO-44, SAPO-56, ALPO-18, and ALPO-34, even more preferably one or a combination of SAPO-18, SAPO-34, ALPO-34, and ALPO-18, and metal containing molecular sieves thereof, and most preferably one or a combination of SAPO-34 and ALPO-18, and metal containing molecular sieves thereof.

In an embodiment, the molecular sieve is an intergrowth material having two or more distinct phases of crystalline structures within one molecular sieve composition. In particular, SAPO intergrowth molecular sieves are described in the U.S. Pat. No. 6,812,372, PCT Publication WO 02/070407, published Sep. 12, 2002, and PCT Publication WO 98/15496, published Apr. 16, 1998, which are fully incorporated herein by reference. For example, SAPO-18, ALPO-18 and RUW-18 have an AEI framework-type, and SAPO-34 has a CHA framework-type. In another embodiment, the molecular sieve comprises at least one intergrown phase of AEI and CHA framework-types, preferably the molecular sieve has a greater amount of CHA framework-type to AEI framework-type, and more preferably the molar ratio of CHA to AEI is greater than 1:1.

Molecular Sieve Synthesis

Generally, molecular sieves are synthesized by the hydrothermal crystallization of one or more of a source of aluminum, a source of phosphorous, a source of silicon, a templating agent, and a metal containing compound. Typically, a combination of sources of silicon, aluminum and phosphorous, optionally with one or more templating agents and/or one or more metal containing compounds, are placed in a sealed pressure vessel, optionally lined with an inert plastic such as polytetrafluoroethylene, and heated, under a crystallization pressure and temperature, at static or stirred conditions, until a crystalline material is formed in a synthesis mixture. Then, in a commercial process in particular, one or more flocculant(s) is added to the synthesis mixture to speed up settling of the crystals and to achieve phase separation, i.e., a solids-rich phase in the lower portion of the vessel and a solids-free or solids-lean liquid layer in the upper portion of the vessel. A portion of the upper liquid layer is removed, decanted, or reduced in quantity. The remaining flocculated product containing the crystalline molecular sieve is then, optionally, contacted with the same or a different fresh liquid, typically with water, in a washing step, from once to many times depending on the desired purity of the supernatant, liquid portion, of the synthesis mixture being removed. It is also optional to repeat this process by adding in additional flocculant followed by additional washing steps. Then, the crystallized molecular sieve is recovered by filtration, centrifugation and/or decanting. Preferably, the molecular sieve is filtered using a filter that provides for separating certain crystal sized molecular sieve particles from any remaining liquid portion that may contain different size molecular sieve crystals.

In a preferred embodiment the molecular sieves are synthesized by forming a reaction product or synthesis mixture of a source of silicon, a source of aluminum, a source of phosphorous and an organic templating agent, preferably a nitrogen containing organic templating agent. This particularly preferred embodiment results in the synthesis of a silicoaluminophosphate crystalline material in a synthesis mixture. One or more flocculants are added to the silicoaluminophosphate crystalline material, and the crystallized molecular sieve is then removed or isolated by filtration, centrifugation and/or decanting.

Non-limiting examples of silicon sources include a silicates, fumed silica, for example, Aerosil-200 available from Degussa Inc., New York, N.Y., and CAB-O-SIL M-5, silicon compounds such as tetraalkyl orthosilicates, for example, tetramethyl orthosilicate (TMOS) and tetraethylorthosilicate (TEOS), colloidal silicas or aqueous suspensions thereof, for example, Ludox-HS-40 sol available from E.I. du Pont de Nemours, Wilmington, Del., silicic acid, alkali-metal silicate, or any combination thereof. The preferred source of silicon is a silica sol.

Non-limiting examples of aluminum sources include aluminum-containing compositions such as aluminum alkoxides, for example, aluminum isopropoxide, aluminum phosphate, aluminum hydroxide, sodium aluminate, pseudo-boehmite, gibbsite and aluminum trichloride, or any combinations thereof. A preferred source of aluminum is pseudo-boehmite, particularly when producing a silicoaluminophosphate molecular sieve.

Non-limiting examples of phosphorous sources, which may also include aluminum-containing phosphorous compositions, include phosphorous-containing, inorganic or organic, compositions such as phosphoric acid, organic phosphates such as triethyl phosphate, and crystalline or amorphous aluminophosphates such as $AlPO_4$, phosphorous salts, or combinations thereof. The preferred source of phosphorous is phosphoric acid, particularly when producing a silicoaluminophosphate.

Templating agents are generally compounds that contain elements of Group VA of the Periodic Table of Elements, particularly nitrogen, phosphorus, arsenic and antimony, more preferably nitrogen or phosphorous, and most preferably nitrogen. Typical templating agents of Group VA of the Periodic Table of elements also contain at least one alkyl or aryl group, preferably an alkyl or aryl group having from 1 to 10 carbon atoms, and more preferably from 1 to 8 carbon atoms. The preferred templating agents are nitrogen-containing compounds such as amines and quaternary ammonium compounds.

The quaternary ammonium compounds, in one embodiment, are represented by the general formula $R_4N^+$, where each R is hydrogen or a hydrocarbyl or substituted hydrocarbyl group, preferably an alkyl group or an aryl group having from 1 to 10 carbon atoms. In one embodiment, the templating agents include a combination of one or more quaternary ammonium compound(s) and one or more of a mono-, di- or triamine.

Non-limiting examples of templating agents include tetraalkyl ammonium compounds including salts thereof such as tetramethyl ammonium compounds including salts thereof. The preferred templating agent or template is a tetraethylammonium compound, tetraethyl ammonium hydroxide (TEAOH) and salts thereof, particularly when producing a SAPO molecular sieve.

Flocculants

There are many types of flocculants, including both inorganic and organic flocculants. Inorganic flocculants are typically aluminum or iron salts that form insoluble hydroxide precipitates in water. Non-limiting examples such as aluminum sulfate, poly (aluminum chloride), sodium aluminate, iron (III)-chloride and sulfate, iron (II) sulfate, and sodium silicate (activated silica). The major classes of organic flocculants are: (1) nonionic flocculants, for example, polyethylene oxide, polyacrylamide (PAM), partially hydrolyzed polyacrylamide (HPAM), and dextran; (2) cationic flocculants, for example, polyethyleneimine (PEI), polyacrylamide-co-trimethylammonium, ethyl methyl acrylate chloride (PTAMC), and poly (N-methyl-4-vinylpyridinium iodide); and (3) anionic flocculants, for example, poly (sodium acrylate), dextran sulfates, and/or high molecular weight ligninsulfonates prepared by a condensation reaction of formaldehyde with ligninsulfonates, and polyacrylamide. Where the synthesis mixture includes water, it is preferable that the flocculant used is water soluble. Additional information on flocculation is discussed in G. J. Fleer and J. H. M. Scheutjens, *Coagulation and Flocculation Theory and Applications*, ed. by B. Döbias, pp. 209-263, Marcel Dekker, New York, 1993, which is fully incorporated herein by reference.

In one embodiment, a flocculant has an average molecular weight about 500 to about 50,000,000, preferably about 1,000 to about 20,000,000, more preferably about 2,000 to about 15,000,000, and most preferably about 3,000 to about 10,000,000.

Molecular sieve crystalline products, as discussed herein, must be recovered from the synthesis mixture in order to produce the final product, the molecular sieve catalyst. Mechanical means of separation, or recovery, may be used, and include, but are not limited to, centrifugation, filtration, washing, filterpressing, and any other means of mechanically enhancing separation. Gravitational settling or natural settling, may also accomplish recovery of the crystals. These methods, though, are slow and inefficient, and may result in loss of product due to dissolution of the molecular sieve crystalline product under mother liquor conditions at or near ambient temperature. Therefore, a faster more efficient means is necessary.

When commercially recovering any of the molecular sieves discussed above, typically one or more chemical reagents are added to the crystallization vessel or synthesis reactor after crystallization is substantially complete, preferably complete. Optionally, the synthesis mixture is transferred to another vessel separate from the reaction vessel or the vessel in which crystallization occurs, and a flocculant is then added to this other vessel from which the crystalline molecular sieve is ultimately recovered. These chemical reagents or flocculants are used to increase the recovery rate of the molecular sieve crystals and increase the recovery yield of the synthesized molecular sieve crystals. While not wishing to be bound to any particular theory, these flocculants act either as (1) a surface charge modifier that results in the agglomeration of very small particles into larger aggregates of molecular sieve particles; (2) surface anchors that bridge many small particles to form aggregates of molecular sieve particles; or (3) spacers to prevent crystals from packing too closely that may restrict liquid flow during filtration and washing. The aggregates of the molecular sieve crystals are then easily recovered by well known techniques such as filtration or through a filter press process.

The flocculant is added to the synthesis mixture after crystallization has occurred from the combination of one or more of a silicon source, a phosphorous source, an aluminum source, and a templating agent. The synthesized molecular sieve is then recovered by filtration, however, optionally, the synthesized molecular sieve is washed and additional flocculant is used to further aggregate any remaining synthesized molecular sieve from the liquid portion of the synthesis mixture.

The flocculant may be added to the synthesis mixture after crystallization in an amount from about 0.01 to about 10 wt %, preferably from about 0.02 to about 5 wt %, more preferably from about 0.025 to about 3 wt %, flocculant based on expected solid molecular sieve product yield, crystal size, and presence of nano particles and ionicity of the medium. It is preferable that the product slurry and/or flocculant are diluted to obtain a volume of product slurry to volume of flocculant of between 1:100 and 100:1. Good mixing between the product slurry and the flocculant is also preferred. However, too severe mixing is avoided to prevent breaking up of the floccs formed. One can recover the flocculated sieve starting from the total mixture by centrifugation or filtration or one can allow the mixture to settle, decant the liquid, re-slurry with water, diluting, eventually repeatedly decant and re-slurry, and finally recover by filtration or centrifugation. The settling of the sieve can take from minutes to days; however, the settling can be accelerated by adding additional flocculant or use of high molecular weight flocculant. The flocculant is typically added to the slurry at room temperature, and is preferably added as a solution. Should a solid flocculant be used then it is preferable that a substantially homogeneous flocculant solution or suspension or emulsion is prepared by dissolving or dispersing the solid flocculant in a liquid medium.

The flocculant may be in a solution or suspension or emulsion or micro-emulsion, preferably an aqueous solution or emulsion or micro-emulsion. Further, the flocculant in the aqueous solution may be diluted with water. Without being bound to any particular theory, it has been found that dilution of the molecular sieve slurry, preferably one recovered using a flocculant, prevents or reduces dissolution of the molecular sieve in the slurry. This benefit provides for a further improvement in yield, and allows for the slurry to be stored for an extended period of time.

A synthesis mixture comprising a molecular sieve and a flocculant has a pH depending on the composition and amount of the molecular sieve, excess amount of template, degree of crystallization and type and amount of flocculant. The synthesis mixture typically has a pH in the range of from 3 to 10, for example, in the range of from 3.2 to 9.8, such as in the range of from 3.5 to 9.5. Generally, the starting synthesis mixture of alumina, silica, and template is sealed in a vessel and heated, preferably under autogenous pressure, to a temperature in the range of about 80° C. to about 250° C., and such as about 150° C. to about 180° C. The time required to form the crystalline molecular sieve is typically from immediately up to several weeks, the duration of which is usually dependent on the temperature; the higher the temperature the shorter the duration. Typically, the crystalline molecular sieve product is formed, usually in a slurry state, and then a flocculant is introduced to this slurry, the synthesis mixture. The crystalline molecular sieve is then recovered by any standard technique well known in the art, for example, centrifugation or filtration.

Further, the isolated or separated crystalline product, the synthesized molecular sieve, is washed, typically using a liquid such as water, from one to many times, or in a semi-continuous or continuous way for variable lengths of time. The washed crystalline product is then optionally dried, such as in air, to a level such that the resulting, partially dried or dried crystalline product or synthesized molecular sieve has a loss on ignition (LOI) in the range of about 0.5 weight percent to about 85 weight percent, such as about greater than about 1 weight percent to about 80 weight percent, for example, about 5 weight percent to about 75 weight percent, such as about 10 weight percent to about 70 weight percent, for example, about 12 weight percent to about 65 weight percent. This moisture containing crystalline product, synthesized molecular sieve or wet filtercake, is then used below in the formulation of the molecular sieve catalyst composition of the invention.

Flocculant Optimization

The purpose of adding flocculant is to promote settling of the molecular sieve in the synthesis mixture to allow recovery of the molecular sieve crystalline product slurry from the liquid portion of the synthesis mixture. Increasing the amount of flocculant added to the synthesis mixture increases the rate of settling, thereby reducing the time needed to produce a final formulated catalyst product. However, the addition of more flocculant to the synthesis mixture also increases the viscosity of the molecular sieve crystalline product slurry produced. The addition of too much flocculant results in a molecular sieve crystalline product for which the processing steps to produce a formulated catalyst product are made more difficult and in some cases impossible. As used herein, "processable" means having a viscosity that facilitates the formulation steps for a particular formulated catalyst product. An effective amount of flocculant is an amount that reduces the settling time when compared to the time required to recover the molecular sieve crystalline product by purely mechanical means but results in a slurry viscosity that can be tolerated in the remaining processing steps to produce a particular formulated catalyst product.

In one embodiment of the invention, determining, quantitatively, the effective amount of flocculant necessary to recover the molecular sieve from the synthesis mixture without creating viscosity problems when the recovered molecular sieve is formulated into a high solids content slurry is accomplished by establishing a relationship between the viscosity of the resulting molecular sieve slurry and the amount of flocculant, using a laboratory scale technique. In one embodiment, an effective amount of flocculant, will result in the settling out of the molecular sieve crystalline product from the synthesis mixture without resulting in a molecular sieve product slurry viscosity of greater than 10,000 cps.

Essentially, the method of this one embodiment involves first recovering a portion of the crystalline product from the synthesis mixture without the addition of flocculant by, for example, centrifuge separation and thorough washing. The washed product is then formulated into a slurry by adding a binder and optionally a matrix material, followed by mixing and milling. The viscosity of the resultant slurry is then measured. This serves as the flocculant-free case and has the lowest viscosity that can be achieved for this particular system. A series of experiments are then carried out by adding predetermined amounts of flocculant to the base slurry, measuring the viscosities of the resultant slurries and establishing a viscosity-flocculant level curve. From this curve, the maximum amount of flocculant allowable to achieve a tolerable slurry viscosity can be determined.

More particularly, the method of said one embodiment comprises the steps of: (a) preparing a molecular sieve product mixture, the molecular sieve product mixture comprising: (i) the molecular sieve crystalline product, (ii) a binder, and (iii) optionally a matrix material; (b) separating the molecular sieve product mixture into a plurality of samples; (c) mixing at least two of the plurality of samples with a quantity of flocculant to produce a plurality of flocculated samples, wherein at least two of the plurality of flocculated samples have a different ratio of flocculant to molecular sieve crystalline product mixture; (d) measuring the viscosity of at least two of the plurality of flocculated samples having a different ratio of flocculant to molecular sieve crystalline product mixture; (e) establishing a relationship between the quantity of flocculant and the viscosity measurements; and (f) determining from the relationship the amount of flocculant effective to recover the molecular sieve crystalline product slurry resulting in a processable molecular sieve crystalline product.

In conducting the above method, the mixture is initially separated into a plurality of samples and different amounts of flocculant are then added to at least two of the plurality of samples. Optionally, one sample may be left substantially flocculant-free. The samples are mixed and slurries of at least two of the samples are prepared. The viscosity of the slurries is measured. The viscosities of at least two samples, preferably at least three samples, are plotted versus the amounts of flocculant added to the respective samples. The plot may be prepared by hand or by computer. From the plot and the respective best fit line through the various data points, the preparer can determine the amount of flocculant effective to recover the molecular sieve crystalline product that will form a processable molecular sieve crystalline product. A relationship should be established for each molecular sieve and flocculant. An established relationship is specific to the molecular sieve and the flocculant used in determining the relationship.

In a second embodiment, the optimal amount of flocculant necessary to recover the molecular sieve from the synthesis mixture is determined by measuring the zeta potential of the molecular sieve particles. Zeta potential is a measurement of the localized electric field close to the surface of a solid particle. A positively charged surface gives a positive zeta potential in mV while a negatively charged surface gives a negative zeta potential in mV. A non-charged surface is neutral and has a zero mV. The higher the surface charge density (number of charges per area) the higher is the zeta potential. In general, as the zeta potential of the surface of a particle in a slurry approaches zero, the particle becomes more susceptible to separation from the slurry.

Molecular sieves present in aqueous solutions have surface hydroxyl groups. These hydroxyl groups can interact with both cations and anions depending on the concentration and type these charged species. For aqueous solutions, depending on pH, protons or hydroxyl anions can be dominant. At low pH (significantly below 7), protons are dominant, which could make the crystal surface become positively charged. Likewise, at high pH (significantly above 7), hydroxyl anions are dominant, which could make the crystal surface become negatively charged. Therefore, the surface charge of molecular sieves is highly dependent on pH and presence of other ionic species in the aqueous system. For a given material, by varying the system pH, a point is reached where the surface charge created by all cations and the surface charged created by all anions are equalized making the surface not charged. This pH is called the isoelectric point (IEP). IEP is a characteristic of a particular surface composition. Therefore, in general, zeta potential is a sensitive method to determine surface composition in an aqueous system. For example, a clean silica surface has an IEP of 2 or lower, however, the presence of low levels of $Al^{3+}$ in the system could lead to a major increase in IEP to 3 or 4 or even higher depending on actual amount of $Al^{3+}$ present on surface.

By adding a cationic flocculant to a molecular sieve with a negative zeta potential, or by adding an anionic flocculant to a molecular sieve with a positive zeta potential, the surface charge on the molecular sieve can be moved closer to zero. Hence, in the method of the second embodiment, varying amounts of flocculant are added to a molecular sieve in a slurry, optionally together with a binder and/or a matrix material, and the zeta potentials of the resultant samples are measured to allow the optimal amount of flocculant to be determined for the particular system concerned. In general, the amount of flocculant is selected so that, after flocculant addition, the zeta potential is within the range of about +30 mV to about −30 mV, typically in the range of about +20 mV to about −20 mV, for example, in the range of about +15 mV to about −15 mV.

In one embodiment, the amount of flocculant effective to recover the molecular sieve crystalline product is determined by the above methods to be from about 20 ppm to about 10 wt % flocculant based on expected solid molecular sieve product yield, preferably from about 50 ppm to about 5 wt %, more preferably from about 100 ppm to about 35 wt %, most preferably from about 150 ppm to about 3 wt %.

The amount of flocculant introduced to the flocculation vessel, depends on the quantity of molecular sieve being recovered, the type of molecular sieve, the pH of the synthesis mixture, the size of the molecular sieve crystals, etc. In one embodiment, the amount of molecular sieve recovered is in the range of about 50 kg to about 20,000 kg or greater, preferably in the range of from about 100 kg to about 20,000 kg, more preferably about 150 kg to about 20,000 kg, and most preferably about 200 kg to about 20,000 kg. In another embodiment, the reactor vessel is capable of synthesizing an amount of molecular sieve in one batch or at one time in the range of about 50 kg to about 20,000 kg or greater, preferably greater than about 100 kg to about 20,000 kg, more preferably about 150 kg to about 20,000 kg, and most preferably about 200 kg to about 20,000 kg.

In another embodiment, the molecular sieve crystalline product is recovered at a recovery rate of from about 0.5 kg/hr to about 5,000 kg/hr, preferably from about 100 kg/hr to about 4,000 kg/hr, more preferably from about 500 kg/hr to about 3,000 kg/hr, most preferably from about 1,000 kg/hr to about 2,500 kg/hr. In another embodiment, the recovery rate is increased by about 0.5 kg/hr to about 5 kg/hr, preferably by about 1 kg/hr to about 2.5 kg/hr, by using the effective amount of flocculant in combination with the recovery means selected from the group consisting of centrifugation, filtration, filter-pressing, washing, settling, and any other means of mechanically enhancing separation.

For micro-crystalline materials recovered from a flocculation process, there is normally some debris deposited on the surface of the micro-crystalline materials. The debris is defined as material that is smaller in size and having a different composition than that of the micro-crystalline product. One way to express the amount of debris on a crystalline material is defined as surface coverage factor ($\Phi$), or debris factor, which is the fraction of the crystalline external surface covered by debris. A molecular sieve crystalline product having a debris factor of less than about 0.4 is preferred, less than about 0.3 more preferred, and less than about 0.2 most preferred. In one embodiment, a correction factor of about 0.75, preferably about 0.80, more preferably about 0.85, even more preferably about 0.90, most preferably about 0.95, and even most preferably about 0.98, is used to adjust the effective amount of flocculant necessary to recover the molecular sieve crystalline product from the synthesis mixture. The correction factor, as used herein, corrects for the viscosity effects associated with the debris deposits on the molecular sieve crystalline product, represented by the debris factor.

Method for Making Molecular Sieve Catalyst Compositions

Once the molecular sieve is synthesized and recovered as described above, depending on the requirements of the particular conversion process, the molecular sieve is then formulated into a molecular sieve catalyst composition, particularly for commercial use. The molecular sieves synthesized above are made or formulated into molecular sieve catalyst compositions by combining the recovered molecular sieves, with a binder, and optionally, but preferably, with a matrix material to form a formulated molecular sieve catalyst composition. It has been found that when thermally treating a synthesized molecular sieve having been recovered in the presence of a flocculant, prior to formulation, the thermal treatment may maintain or improve the formulated molecular sieve catalyst composition's resistance to attrition in various conversion processes.

This formulated catalyst composition is formed into useful shape and sized particles by well-known techniques such as spray drying, pelletizing, extrusion, and the like, spray drying being the most preferred. It is also preferred that after spray drying for example, that the formulated molecular sieve catalyst composition is then calcined.

Binder

There are many different binders that are useful in forming the molecular sieve catalyst composition. Non-limiting examples of binders that are useful alone or in combination include various types of hydrated alumina, silicas, and/or other inorganic oxide sol. One preferred alumina containing sol is aluminum chlorohydrate. The inorganic oxide sol acts like glue binding the synthesized molecular sieves and other materials such as the matrix together, particularly after thermal treatment. Upon heating, the inorganic oxide sol, preferably having a low viscosity, is converted into an inorganic oxide component. For example, an alumina sol will convert to an aluminum oxide following heat treatment.

Aluminum chlorohydrate, a hydroxylated aluminum based sol containing a chloride counter ion, has the general formula of $Al_mO_n(OH)_oCl_p \cdot x(H_2O)$ wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., Stud. Surf. Sci. and Catal., 76, pages 105-144 (1993), which is fully incorporated herein by reference. In another embodiment, the binders are alumina sols, predominantly comprising aluminum oxide, optionally including some silicon. In yet another embodiment, the binders are peptized alumina made by treating alumina hydrates such as pseudobohemite, with an acid, preferably an acid that does not contain a halogen, to prepare sols or aluminum ion solutions. Non-limiting examples of commercially available colloidal alumina sols include Nalco 8676 available from Nalco Chemical Co., Naperville, Ill., and Nyacol AL20DW, available from Nyacol Nano Technologies, Inc., Ashland, Mass.

In one embodiment, the weight ratio of the binder to the molecular sieve is in the range of about 0.1 to about 0.5, such as in the range of from about 0.11 to about 0.48, for example, from about 0.12 to about 0.45, conveniently from about 0.13 to less than about 0.45, such as in the range of from about 0.15 to about 0.4. See, for example, U.S. Patent Application Publication No. 2003/0181322, published Sep. 25, 2003, which is fully incorporated herein by reference.

Matrix Material

The synthesized molecular sieve described above is typically combined with a binder and one or more matrix material(s). Matrix materials are effective in reducing overall catalyst cost, acting as thermal sinks assisting in shielding heat from the catalyst composition, for example, during regeneration, densifying the catalyst composition, increasing catalyst strength such as crush strength and attrition resistance, and in controlling the rate of conversion in a particular process.

Non-limiting examples of matrix materials include one or more of: rare earth metals, non-active, metal oxides including titania, zirconia, magnesia, thoria, beryllia, quartz, silica or sols, and mixtures thereof, for example, silica-magnesia, silica-zirconia, silica-titania, silica-alumina and silica-alumina-thoria. In an embodiment, matrix materials are natural clays such as those from the families of montmorillonite and kaolin. These natural clays include subbentonites and those kaolins known as, for example, Dixie, McNamee, Georgia and Florida clays. In one embodiment, the matrix material, preferably any of the clays, are subjected to well known modification processes such as calcination and/or acid treatment and/or chemical treatment. In one preferred embodiment, the matrix material is kaolin, particularly kaolin having an average particle size of about 0.1 μm to about 0.6 μm with a $d_{90}$ particle size of less than about 10 μm. Binder may also function as a matrix material. Where the binder functions as a matrix material, a second matrix material may also be added.

Upon combining the molecular sieve and the binder, with a matrix material, in a liquid to form a slurry, mixing, preferably vigorous mixing, is needed to produce a substantially homogeneous mixture containing the flocculated molecular sieves. Non-limiting examples of suitable liquids include one or a combination of water, alcohol, ketones, aldehydes, and/or esters. The most preferred liquid is water. In one embodiment, the slurry is high shear or bead milled for a period of time sufficient to produce the desired slurry texture, particle size, and/or particle size distribution.

The liquid containing the molecular sieve and binder, and the matrix material, are in the same or different liquid, and are combined in any order, together, simultaneously, sequentially, or a combination thereof. In the preferred embodiment, the same liquid, preferably water is used.

Solids Content

The molecular sieve catalyst composition in one embodiment is made by preparing a slurry containing the molecular sieve, a binder, and a matrix material. The solids content of the slurry is typically about 30% to about 85% by weight. The composition of the solids includes about 10% to about 80% by weight of the molecular sieve, such as about 20% to about 65% by weight of the molecular sieve, for example, about 30% to about 60% by weight of the molecular sieve; about 2% to about 25%, such as about 5% to about 20%, by weight of the binder; and about 10% to about 90%, such as about 15% to about 85%, by weight of the matrix material.

In another embodiment, the solids content in a slurry comprising the molecular sieve, a binder, optionally a matrix material, and a liquid medium is in the range of about 40 weight percent to about 80 weight percent, for example, in the range of from about 41 weight percent to about 70 weight percent, such as in the range of from about 41.5 weight percent to about 60 weight percent, conveniently in the range of from about 42 weight percent to about 59 weight percent.

The molecular sieve catalyst composition particles contain some water, templating agent or other liquid components, therefore, the weight percents that describe the solid content in the slurry are preferably expressed in terms exclusive of the amount of water, templating agent and removable components upon calcination at elevated temperature. The most preferred condition for measuring solids content is on a calcined basis as, for example, measured by the LOI procedure discussed below. On a calcined basis, the solid content in the slurry, more specifically, the molecular sieve catalyst composition particles in the slurry, are about 20 percent by weight to about 80 percent by weight molecular sieve, about 5 percent by weight to about 20 percent by weight binder, and about 0 percent by weight to about 80 percent by weight matrix material. See, for example, U.S. Pat. No. 6,787,501, which is fully incorporated herein by reference.

In another embodiment, the molecular sieve is combined with a binder and/or a matrix material forming a slurry such that the pH of the slurry is above or below the isoelectric point (IEP) of the molecular sieve. Preferably the slurry comprises the molecular sieve, the binder and the matrix material and has a pH different from, above or below, preferably below, the IEP of the molecular sieve, the binder and the matrix material. In an embodiment, the pH of the slurry is in the range of from 2 to 7, preferably from 2.3 to 6.2; the IEP of the molecular sieve is in the range of about 2.5 to less than 7, preferably about 2.7 to 6.5; the IEP of the binder is greater than 10; and the IEP of the matrix material is at or less than about 2. See PCT Patent Publication WO 03/000412 A1, published Jan. 3, 2003, which is fully incorporated herein by reference.

As the slurry is mixed, particle size reduction is achieved. It is generally desirable that these particles are small and have a size distribution such that the $d_{90}$ of these particles is less than about 20 μm, such as less than about 15 μm, for example, less than about 10 μm, and conveniently about 7 μm. The $d_{90}$ for purposes of this patent application and appended claims means that 90 percent by volume of the particles in the slurry have a particle diameter lower than the $d_{90}$ value. For the purposes of this definition, the particle size distribution used to define the $d_{90}$ is measured using well known laser scattering techniques using a Microtrac Model S3000 particle size analyzer from Microtrac, Inc., Largo, Fla.

In an embodiment of the invention, the resulting processable molecular sieve crystalline product forms a slurry having a viscosity less than about 10,000 cps, typically less than about 9,000 cps, such as less than about 8,000 cps, for example, less than about 7,000 cps. To determine the viscosity of the slurry, the following analytical method is followed by preparing a formulated slurry using the flocculated molecular sieve, which includes, but is not limited to, molecular sieves based on silicon, aluminum, and phosphorous; metal containing molecular sieves; and zeolites.

In one embodiment, the slurry of the recovered molecular sieve, binder and matrix material is mixed or milled to achieve a sufficiently uniform slurry of particles of the molecular sieve catalyst composition to form a formulation composition that is then fed to a forming unit that produces the formulated molecular sieve catalyst composition. In a preferred embodiment, the forming unit is a spray dryer. Typically, the forming unit is maintained at a temperature sufficient to remove most of the liquid from the slurry, and from the resulting molecular sieve catalyst composition. The resulting catalyst composition when formed in this way takes the form of microspheres.

When a spray dryer is used as the forming unit, typically, any one or a combination of the slurries described above, more particularly a slurry of the recovered molecular sieves, binder, and matrix material, is co-fed to the spray dryer with a drying gas with an average inlet temperature ranging from 200° C. to 550° C., and a combined outlet temperature ranging from 70° C. to about 225° C. In an embodiment, the average diameter of the spray dried formed catalyst composition is about 40 μm to about 300 μm, preferably about 50 μm to about 250 μm, more preferably about 50 μm to about 200 μm, and most preferably about 55 μm to about 120 μm.

During spray drying, the slurry is passed through a nozzle distributing the slurry into small droplets, resembling an aerosol spray into a drying chamber. Atomization is achieved by forcing the slurry through a single nozzle or multiple nozzles with a pressure drop in the range of from 100 psia to 1000 psia (690 kPaa to 6895 kPaa). In another embodiment, the slurry is co-fed through a singe nozzle or multiple nozzles along with an atomization fluid such as air, steam, flue gas, or any other suitable gas. Generally, the size of the microspheres is controlled to some extent by the solids content of the slurry. However, control of the size of the catalyst composition and its spherical characteristics are controllable by varying the slurry feed properties and conditions of atomization, such as nozzle size, atomization medium, pressure drop, and flow rate.

Other methods for forming a molecular sieve catalyst composition are described in U.S. Pat. No. 6,509,290 (spray drying using a recycled molecular sieve catalyst composition), which is fully incorporated herein by reference.

Once the molecular sieve catalyst composition is formed, formed catalyst composition is normally calcined to further harden and/or activate the catalyst composition. Typical calcination temperatures are in the range of about 500° C. to about 800° C., and preferably about 550° C. to about 700° C., preferably in a calcination environment such as air, nitrogen, helium, flue gas (combustion product lean in oxygen), or any combination thereof. Calcination time is typically dependent on the degree of hardening of the molecular sieve catalyst composition and is in the range of about 15 minutes to about 20 hours at a temperature in the range of from about 500° C. to about 700° C.

In one embodiment, the molecular sieve catalyst composition or formulated molecular sieve catalyst composition has an Attrition Rate Index (ARI) less than about 10 weight percent per hour, preferably less than about 5 weight percent per hour, preferably less than about 2 weight percent per hour, more preferably less than about 1 weight percent per hour, and most preferably less than about 0.5 weight percent per hour. ARI is calculated as discussed below.

Process for Using the Molecular Sieve Catalyst Compositions

The molecular sieve catalyst compositions described above are useful in a variety of processes including: cracking of, for example, a naphtha feed to light olefin(s) (U.S. Pat. No. 6,300,537) or higher molecular weight (MW) hydrocarbons to lower MW hydrocarbons; hydrocracking of, for example, heavy petroleum and/or cyclic feedstock; isomerization of, for example, aromatics such as xylene, polymerization of, for example, one or more olefin(s) to produce a polymer product; reforming; hydrogenation; dehydrogenation; dewaxing of, for example, hydrocarbons to remove straight chain paraffins; absorption of, for example, alkyl aromatic compounds for separating out isomers thereof; alkylation of, for example, aromatic hydrocarbons such as benzene and alkyl benzene, optionally with propylene to produce cumene or with long chain olefins; transalkylation of, for example, a combination of aromatic and polyalkylaromatic hydrocarbons; dealkylation; dehydrocyclization; disproportionation of, for example, toluene to make benzene and paraxylene; oligomerization of, for example, straight and branched chain olefin(s); and dehydrocyclization.

Preferred processes are conversion processes including naphtha to highly aromatic mixtures; light olefin(s) to gasoline, distillates and lubricants; oxygenates to olefin(s); light paraffins to olefins and/or aromatics; and unsaturated hydrocarbons (ethylene and/or acetylene) to aldehydes for conversion into alcohols, acids and esters. The most preferred process of the invention is a process directed to the conversion of a feedstock comprising one or more chalcogenides to one or more olefin(s).

The molecular sieve catalyst compositions described above are useful in converting a wide variety of different chalcogenide-containing feedstocks. Typically, the feedstock contains one or more aliphatic-containing compounds that include alcohols, amines, carbonyl compounds, for example, aldehydes, ketones and carboxylic acids, ethers, halides, mercaptans, sulfides, and the like, and mixtures thereof. The aliphatic moiety of the aliphatic-containing compounds typically contains from 1 to about 50 carbon atoms, preferably from 1 to 20 carbon atoms, more preferably from 1 to 10 carbon atoms, and most preferably from 1 to 4 carbon atoms.

Non-limiting examples of aliphatic-containing compounds include: alcohols such as methanol and ethanol, alkyl-mercaptans such as methyl mercaptan and ethyl mercaptan, alkyl-sulfides such as methyl sulfide, alkyl-amines such as methyl amine, alkyl-ethers such as dimethyl ether, diethyl ether and methylethyl ether, alkyl-halides such as methyl chloride and ethyl chloride, alkyl ketones such as dimethyl ketone, formaldehydes, and various acids such as acetic acid.

In an embodiment of the process of the invention, the feedstock contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. Generally, the feedstock is selected from one or more of methanol, ethanol, dimethyl ether, diethyl ether or a combination thereof, such as methanol and dimethyl ether, and typically methanol.

The various feedstocks discussed above are converted primarily into one or more olefin(s). The olefin(s) produced from the feedstock typically have from 2 to 30 carbon atoms, preferably 2 to 8 carbon atoms, more preferably 2 to 6 carbon atoms, still more preferably 2 to 4 carbons atoms, and most preferably ethylene and/or propylene. Non-limiting examples of olefin monomer(s) include ethylene, propylene, butene-1, pentene-1, 4-methyl-pentene-1, hexene-1, octene-1 and decene-1, preferably ethylene, propylene, butene-1, pentene-1, 4-methyl-pentene-1, hexene-1, octene-1 and isomers thereof.

The feedstock, in one embodiment, contains one or more diluent(s), which are typically used to reduce the concentration of the feedstock, and which are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The process for converting a feedstock, especially a feedstock containing one or more oxygenates, in the presence of a molecular sieve catalyst can be a fixed bed process, a fluidized bed process (includes a turbulent bed process), preferably a continuous fluidized bed process, and most preferably a continuous high velocity fluidized bed process.

The reaction can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in, for example, U.S. Pat. Nos. 4,076,796 and 6,287,522 (dual riser), and *Fluidization Engineering*, D. Kunii and O. Levenspiel, Robert E. Krieger Publishing Company, New York, N.Y. 1977, which are all fully incorporated herein by reference. The preferred reactor type are riser reactors generally described in *Riser Reactor, Fluidization and Fluid-Particle Systems*, pp. 48 to 59, F. A. Zenz and D. F. Othmer, Reinhold Publishing Corporation, New York, 1960, and U.S. Pat. No. 6,166,282 (fast-fluidized bed reactor), and U.S. patent application Ser. No. 09/564,613. filed May 4, 2000 (multiple riser reactor), which are all fully incorporated herein by reference.

In the preferred embodiment, a fluidized bed process or high velocity fluidized bed process includes a reactor system, a regeneration system and a recovery system.

Reactor System

The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen.

The feedstock entering the reactor system is preferably converted, partially or fully, in the first reactor zone into a gaseous effluent that enters the disengaging vessel along with a coked or further coked molecular sieve catalyst composition. In the preferred embodiment, cyclone(s) within the disengaging vessel are designed to separate the molecular sieve catalyst composition from the gaseous effluent containing one or more olefin(s) within the disengaging zone. Although cyclones are preferred, gravity effects within the disengaging vessel will also separate the catalyst compositions from the gaseous effluent. Other methods for separating the catalyst compositions from the gaseous effluent include the use of plates, caps, elbows, and the like.

In one embodiment, a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel.

The conversion temperature employed in the conversion process, specifically within the reactor system, is generally in the range of about 200° C. to about 1000° C., such as about 250° C. to about 800° C., for example, about 250° C. to about 750° C., conveniently about 300° C. to about 650° C., such as about 350° C. to about 600° C., for example, about 350° C. to about 550° C.

The conversion pressure can also vary over a wide range including autogenous pressure. The conversion pressure is based on the partial pressure of the feedstock exclusive of any diluent therein. Typically the conversion pressure employed in the process is in the range of about 0.1 kPaa to about 5 MPaa, for example, about 5 kPaa to about 1 MPaa, such as about 20 kPaa to about 500 kPaa.

The weight hourly space velocity (WHSV) can also vary over a wide range, but typically is in the range of about 1 hr$^{-1}$ to about 5000 hr$^{-1}$, such as about 2 hr$^{-1}$ to about 3000 hr$^{-1}$, for example, about 5 hr$^{-1}$ to about 1500 hr$^{-1}$, and conveniently about 10 hr$^{-1}$ to about 1000 hr$^{-1}$. In one preferred embodiment, the WHSV is greater than 20 hr$^{-1}$, preferably the WHSV for conversion of a feedstock containing methanol and dimethyl ether is in the range of about 20 hr$^{-1}$ to about 300 hr$^{-1}$.

In the case of a fluidized bed process, the superficial gas velocity (SGV) of the feedstock including diluent and reaction products within the reactor system is preferably sufficient to fluidize the molecular sieve catalyst composition within a reaction zone in the reactor. The SGV is typically at least 0.1 meter per second (m/sec), for example, greater than 0.5 m/sec, such as greater than 1 m/sec, conveniently greater than 2 m/sec, such as greater than 3 m/sec, for example, greater than 4 m/sec. See, for example, U.S. Pat. No. 6,552,240, which is fully incorporated herein by reference. Other processes for converting an oxygenate to olefin(s) are described in U.S. Pat. No. 5,952,538 (WHSV of at least 20 hr$^{-1}$ and a Temperature Corrected Normalized Methane Selectivity (TCNMS) of less than 0.016), EP-0 642 485 B1 (WHSV is from 0.01 hr$^{-1}$ to about 100 hr$^{-1}$, at a temperature of about 350° C. to 550° C.), and PCT WO 01/23500 published Apr. 5, 2001 (propane reduction at an average catalyst feedstock exposure of at least 1.0), which are all fully incorporated herein by reference.

The coked molecular sieve catalyst composition is withdrawn from the disengaging vessel, preferably by one or more cyclones(s), and introduced to the regeneration system.

Regeneration System

The regeneration system comprises a regenerator where the coked catalyst composition is contacted with a regeneration medium, preferably a gas containing oxygen, under general regeneration conditions of temperature, pressure and residence time. Non-limiting examples of the regeneration medium include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. The regeneration conditions are those capable of removing coke from the coked catalyst composition, preferably to a level less than 0.5 weight percent based on the total weight of the coked molecular sieve catalyst composition entering the regeneration system. The coked molecular sieve catalyst composition withdrawn from the regenerator forms a regenerated molecular sieve catalyst composition. By controlling the flow of the regenerated molecular sieve catalyst composition or cooled regenerated molecular sieve catalyst composition from the regeneration system to the reactor system, the optimum level of coke on the molecular sieve catalyst composition entering the reactor is maintained. There are many techniques for controlling the flow of a molecular sieve catalyst composition described in Michael Louge, *Experimental Techniques, Circulating Fluidized Beds*, Grace, Avidan and Knowlton, eds., Blackie, 1997 (pp. 336-337), which is fully incorporated herein by reference.

The regeneration temperature is generally in the range of about 200° C. to about 1500° C., such as about 300° C. to about 1000° C., for example, about 450° C. to about 750° C., conveniently about 550° C. to about 700° C. The regeneration pressure is in the range of about 15 psia (103 kPaa) to about 500 psia (3448 kPaa), such as about 20 psia (138 kPaa) to about 250 psia (1724 kPaa), for example, about 25 psia (172 kPaa) to about 150 psia (1034 kPaa), conveniently about 30 psia (207 kPaa) to about 60 psia (414 kPaa). The residence time of the molecular sieve catalyst composition in the regenerator is generally in the range of about one minute to several hours, for example, about one minute to 100 minutes, and the volume of oxygen in the regeneration gas is generally in the range of about 0.01 mole percent to about 5 mole percent based on the total volume of the gas.

Other regeneration processes are described in U.S. Pat. No. 6,023,005 (coke levels on regenerated catalyst), U.S. Pat. No. 6,245,703 (fresh molecular sieve added to regenerator) and U.S. Pat. No. 6,290,916 (controlling moisture), U.S. Pat. No. 6,613,950 (cooled regenerated catalyst returned to regenerator), U.S. Pat. No. 6,441,262 (regenerated catalyst contacted with alcohol), and PCT WO 00/49106, published Aug. 24, 2000 (cooled regenerated catalyst contacted with by-products), which are all fully incorporated herein by reference.

The gaseous effluent is withdrawn from the disengaging system and is passed through a recovery system.

Recovery System

There are many well known recovery systems, techniques and sequences that are useful in separating olefin(s) and purifying olefin(s) from the gaseous effluent. Recovery systems generally comprise one or more or a combination of a various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment, for example, various condensers, heat exchangers, refrigeration systems or chill trains, compressors, knock-out drums or pots, pumps, and the like. Non-limiting examples of these towers, columns, splitters or trains used alone or in combination include one or more of a demethanizer, preferably a high temperature demethanizer, a deethanizer, a depropanizer, preferably a wet depropanizer, a wash tower often referred to as a caustic wash tower and/or quench tower, absorbers, adsorbers, membranes, ethylene (C2) splitter, propylene (C3) splitter, butene (C4) splitter, and the like.

Various recovery systems useful for recovering predominately olefin(s), preferably prime or light olefin(s) such as ethylene, propylene and/or butene are described in U.S. Pat. No. 5,960,643 (secondary rich ethylene stream), U.S. Pat. Nos. 5,019,143, 5,452,581 and 5,082,481 (membrane separations), U.S. Pat. No. 5,672,197 (pressure dependent adsorbents), U.S. Pat. No. 6,069,288 (hydrogen removal), U.S. Pat. No. 5,904,880 (recovered methanol to hydrogen and carbon dioxide in one step), U.S. Pat. No. 5,927,063 (recovered methanol to gas turbine power plant), and U.S. Pat. No. 6,121,504 (direct product quench), U.S. Pat. No. 6,121,503 (high purity olefins without superfractionation), and U.S. Pat. No. 6,293,998 (pressure swing adsorption), which are all fully incorporated herein by reference.

In particular with a conversion process of oxygenates into olefin(s) utilizing a molecular sieve catalyst composition the resulting effluent gas typically comprises a majority of ethylene and/or propylene and a minor amount of four carbon and higher carbon number products and other by-products, excluding water. In one embodiment, high purity ethylene and/or high purity propylene is produced by the process of the invention at a rate greater than 4,500 kg per day, such as greater than 100,000 kg per day, for example, greater than 500,000 kg per day, conveniently greater than 1,000,000 kg per day, 1,500,000 kg per day, 2,000,000 kg per day, or even 2,500,000 kg per day.

Generally accompanying most recovery systems is the production, generation or accumulation of additional products, by-products and/or contaminants along with the preferred prime products. The preferred prime products, the light olefins, such as ethylene and propylene, are typically purified for use in derivative manufacturing processes such as polymerization processes. Therefore, in the most preferred embodiment of the recovery system, the recovery system also includes a purification system to remove various non-limiting examples of contaminants and by-products including, but not limited to, generally polar compounds such as water, alcohols, carboxylic acids, ethers, carbon oxides, ammonia and other nitrogen compounds, chlorides, hydrogen and hydrocarbons such as acetylene, methyl acetylene, propadiene, butadiene and butyne.

Other recovery systems that include purification systems, for example, for the purification of olefin(s), are described in *Kirk-Othmer Encyclopedia of Chemical Technology, 4th Edition*, Volume 9, John Wiley & Sons, 1996, pages 249-271 and 894-899, which is fully incorporated herein by reference. Purification systems are also described in, for example, U.S. Pat. No. 6,271,428 (purification of a diolefin hydrocarbon stream), U.S. Pat. No. 6,293,999 (separating propylene from propane), and U.S. Pat. No. 6,593,506 (purge stream using hydrating catalyst), which is fully incorporated herein by reference.

Included in the recovery systems of the invention are reaction systems for converting the products contained within the effluent gas withdrawn from the reactor or converting those products produced as a result of the recovery system utilized. Suitable well known reaction systems as part of the recovery system primarily take lower value products such as the $C_4$ hydrocarbons, butene-1 and butene-2 and convert them to higher value products. Non-limiting examples of these types of reaction systems include U.S. Pat. No. 5,955,640 (converting a four carbon product into butene-1), U.S. Pat. No. 4,774,375 (isobutane and butene-2 oligomerized to an alkylate gasoline), U.S. Pat. No. 6,049,017 (dimerization of n-butylene), U.S. Pat. Nos. 4,287,369 and 5,763,678 (carbonylation or hydroformulation of higher olefins with carbon dioxide and hydrogen making carbonyl compounds), U.S. Pat. No. 4,542,252 (multistage adiabatic process), U.S. Pat. No. 5,634,354 (olefin-hydrogen recovery), and Cosyns, J. et al., *Process for Upgrading $C_3$, $C_4$ and $C_5$ Olefinic Streams*, Pet. & Coal, Vol. 37, No. 4, (1995) (dimerizing or oligomerizing propylene, butylene and pentylene), which are all fully incorporated herein by reference.

Integrated Processes

In an embodiment, an integrated process is directed to producing light olefin(s) from a hydrocarbon feedstock, preferably a hydrocarbon gas feedstock, more preferably methane and/or ethane. The first step in the process is passing the gaseous feedstock, preferably in combination with a water stream, to a syngas production zone to produce a synthesis gas (syngas) stream. Syngas production is well known, and typical syngas temperatures are in the range of about 700° C. to about 1200° C. and syngas pressures are in the range of about 2 MPa to about 100 MPa. Synthesis gas streams are produced from natural gas, petroleum liquids, and carbonaceous materials such as coal, recycled plastic, municipal waste or any other organic material, preferably synthesis gas stream is produced via steam reforming of natural gas. Generally, a heterogeneous catalyst, typically a copper based catalyst, is contacted with a synthesis gas stream, typically carbon dioxide and carbon monoxide and hydrogen to produce an alcohol, preferably methanol, often in combination with water. In one embodiment, the synthesis gas stream at a synthesis temperature in the range of about 150° C. to about 450° C. and at a synthesis pressure in the range of about 5 MPa to about 10 MPa is passed through a carbon oxide conversion zone to produce an oxygenate containing stream.

This oxygenate containing stream, or crude methanol, typically contains the alcohol product and various other components such as ethers, particularly dimethyl ether, ketones, aldehydes, dissolved gases such as hydrogen methane, carbon oxide and nitrogen, and fusel oil. The oxygenate containing stream, crude methanol, in the preferred embodiment is passed through well known purification processes, distillation, separation and fractionation, resulting in a purified oxygenate containing stream, for example, commercial Grade A and AA methanol. The oxygenate containing stream or purified oxygenate containing stream, optionally with one or more diluents, is contacted with one or more molecular sieve catalyst compositions described above in any one of the processes described above to produce a variety of prime products, particularly light olefin(s), ethylene and/or propylene. Non-limiting examples of this integrated process is described in EP-B-0 933 345, which is fully incorporated herein by reference. In another more fully integrated process, optionally with the integrated processes described above, olefin(s) produced are directed to, in one embodiment, one or more polymerization processes for producing various polyolefins. (See for example, U.S. patent application Ser. No. 09/615,376, filed Jul. 13, 2000, which is fully incorporated herein by reference.)

Light Olefin Usage

The light olefin products, especially the ethylene and the propylene, are useful in polymerization processes that include solution, gas phase, slurry phase and high pressure processes, or a combinations thereof. Particularly preferred is a gas phase or a slurry phase polymerization of one or more olefin(s) at least one of which is ethylene or propylene. These polymerization processes utilize a polymerization catalyst that can include any one or a combination of the molecular sieve catalysts discussed above, however, the preferred polymerization catalysts are those Ziegler-Natta, Phillips-type, metallocene, metallocene-type and advanced polymerization catalysts, and mixtures thereof. The polymers produced by the polymerization processes described above include linear low density polyethylene, elastomers, plastomers, high density polyethylene, low density polyethylene, polypropylene and polypropylene copolymers. The propylene based polymers produced by the polymerization processes include atactic polypropylene, isotactic polypropylene, syndiotactic polypropylene, and propylene random, block or impact copolymers.

In an embodiment, the integrated process comprises a polymerizing process of one or more olefin(s) in the presence of a polymerization catalyst system in a polymerization reactor to produce one or more polymer products, wherein the one or more olefin(s) having been made by converting an alcohol, particularly methanol, using a molecular sieve catalyst composition. The preferred polymerization process is a gas phase polymerization process and at least one of the olefins(s) is either ethylene or propylene, and preferably the polymerization catalyst system is a supported metallocene catalyst system. In this embodiment, the supported metallocene catalyst system comprises a support, a metallocene or metallocene-type compound and an activator, preferably the activator is a non-coordinating anion or alumoxane, or combination thereof, and most preferably the activator is alumoxane.

In addition to polyolefins, numerous other olefin derived products can be formed from the olefin(s) recovered by any one of the processes described above. These products include, but are not limited to, aldehydes, alcohols, acetic acid, linear alpha olefins, vinyl acetate, ethylene dichloride and vinyl chloride, ethylbenzene, ethylene oxide, cumene, isopropyl alcohol, acrolein, allyl chloride, propylene oxide, acrylic acid, ethylene-propylene rubbers, and acrylonitrile, and trimers and dimers of ethylene, propylene or butylenes.

EXAMPLES

Test Methods

Determination of the percentage of liquid or liquid medium and the percentage of template for purposes of this patent specification and appended claims uses a Thermal Gravimetric Analysis (TGA) measurement as follows: An amount of a molecular sieve material, the sample, is loaded into a sample pan of a Cahn TG-121 Microbalance, available from Cahn Instrument, Inc., Cerritos, Calif. During the TGA technique, a flow of 114 cc/min (STP) air was used. The sample is then heated from 25° C. to 180° C. at 30° C./min, held at 180° C. for 3 hours or until the weight of this sample becomes constant. The weight loss is defined as the Loss on Drying (LOD) and represents the fraction of the original sample that is principally water or other liquid medium. Subsequently, the sample is heated at 30° C./min from 180° C. to 650° C. and held at 650° C. for 2 hours. This second loss in weight is considered to be due to removing the template contained in the sieve crystals. The sum of these two losses relative to the initial sample weight is defined as the Loss-On-Ignition (LOI).

The attrition resistance of a molecular sieve catalyst composition is measured using an Attrition Rate Index (ARI), measured in weight percent catalyst composition attrited per hour. ARI is measured by adding 6.0 g of catalyst composition having a particle size distribution ranging from 53 microns to 125 microns to a hardened steel attrition cup. Approximately 23,700 cc/min of nitrogen gas is bubbled through a water-containing bubbler to humidify the nitrogen. The wet nitrogen passes through the attrition cup, and exits the attrition apparatus through a porous fiber thimble. The flowing nitrogen removes the finer particles, with the larger particles being retained in the cup. The porous fiber thimble separates the fine catalyst particles from the nitrogen that exits through the thimble. The fine particles remaining in the thimble represent the catalyst composition that has broken apart through attrition. The nitrogen flow passing through the attrition cup is maintained for 1 hour. The fines collected in the thimble are removed from the unit. A new thimble is then installed. The catalyst left in the attrition unit is attrited for an additional 3 hours, under the same gas flow and moisture levels. The fines collected in the thimble are recovered. The collection of fine catalyst particles separated by the thimble after the first hour are weighed. The amount in grams of fine particles divided by the original amount of catalyst in grams charged to the attrition cup expressed on per hour basis is the ARI, in weight percent per hour (wt. %/hr). ARI is represented by the formula: ARI=C/(B+C)/D multiplied by 100%, wherein B is weight of catalyst composition left in the cup after the attrition test, C is the weight of collected fine catalyst particles after the first hour of attrition treatment, and D is the duration of treatment in hours after the first hour attrition treatment.

Viscosity measurement of catalyst formulation slurries was conducted using a Brookfield DV-II+Pro viscometer (Brookfield Instrument Laboratories Inc., Middlebrook, Mass.) using a #6 spindle at a variety of shear rate, ranging, for example, from 10 RPM to 100 RPM. All measurements were carried out at room temperature. The viscometer was first calibrated with calibration standards having viscosities of 500 cps, 1000 cps, and 3000 cps before measuring the slurry samples. These calibration standards were certified from Brookfield Instrument Laboratories Inc., Middleboro, Mass.

A determination of the molecular sieve slurry viscosity was made as follows. The slurry sample having a solids content of 45%, of which 45% being a molecular sieve, 13.5% alumina binder derived from aluminum chlorohydrite (ACH), and 41.5% kaolin clay was prepared by the following procedure. To make 1000 grams of formulated slurry: (1) add 244 grams of an aluminum chlorohydrite (ACH) solution from Reheis Inc., Berkeley Heights, N.J. (LOI: 75.1%) to 224.5 grams of de-ionized water and mix using a Yamato Model 2100 homogenizer (Yamato Scientific America Inc., Orangeburg, N.Y.) at 700 RPM for 5 minutes; (2) add 310 grams of flocculated molecular sieve and mix using Yamato mixer at 700 RPM for 10 minutes; then mix using a Silverson L4RT-A high-shear mixer (from Silverson Machines Inc., East Longmeadow, Mass.) at 6000 RPM for 3 minutes; (3) add 221.5 grams of APS Ultrafine clay from Engelhard Corporation, Gordon, Ga. (LOI: 15.69%) while mixing using Yamato mixer at 700 RPM for 10 minutes, then mix using a Silverson L4RT-A in-line mixer at 7500 RPM for 60 passes at a flow rate of 1500 g/min. The slurry was left to equilibrate at room temperature to 23-24° C. then the viscosity was measured.

Apparent bulk density (ABD) of a catalyst was determined by first weighing a KIMAX graduated cylinder from KAMBLE USA, accurate to 0.1 cc of 25 cc capacity, and the cylinder weight $W_a$, was recorded. Approximately 25 cc of a spray dried and calcined catalyst was poured into the graduated cylinder, the cylinder bottom was tapped against a lab bench surface at a frequency of 160-170 times per minute for 30 sec to pack the catalyst in the cylinder. The final weight of the cylinder containing the catalyst, $W_b$, was recorded, and the volume of the catalyst, $V_c$, was also recorded. ABD is calculated as ABD=$(W_b-W_a)/NV_c$ in gram per cc.

To determine the debris factor, a scanning electron microscope (SEM) was used. For micro-crystalline materials recovered from a flocculation process, there are some debris deposited on the surface of the micro-crystalline materials. The debris is defined as material that is smaller in size and having a different composition than that of the micro-crystalline product. One way to express the amount of debris on a crystalline material is defined as surface coverage factor ($\Phi$), or debris factor, which is the fraction of the crystalline external surface covered by debris. A convenient way to estimate the debris factor is to use scanning electron microscopy (SEM). This can be done by directly measuring the projected area of the debris on all sides of a crystal under imaging conditions or by taking a SEM image at magnifications of 5,000 to 50,000 times and then estimating the area covered by debris. A debris factor of zero means that the crystal surface is free of any debris. A debris factor of one means that the crystalline external surface is fully covered by debris. The smaller the debris factor the less debris on the crystal surface.

Measurements of zeta potential were made using a DTI 120 Acoustic and Electroacoustic Spectrometer from Dispersion Technology Inc., Bradford, N.Y.

In order to provide a better understanding of the present invention including representative advantages thereof, the following examples are offered.

Recovery of Substantially Flocculant-Free Crystalline Product

The crystallization product produced from an AEI/CHE SAPO intergrowth (gel composition, silica to alumina molar ratio of 0.15) synthesis conducted at 165° C. for 100 hrs was centrifuged and washed. The solids content of the crystallization product was 22 wt %. A total of 4 sample bottles each containing 800 g of slurry were centrifuged at around 2,500-4000 RPM until a dense solid phase was formed at the bottom and a clear liquid phase was formed on the top. The top clear layer was decanted off. De-ionized water was added to the dense layer to 800 g in each bottle, mixed, and then centrifuged at 2,500-4,000 RPM. This process was repeated until the conductivity of the top clear layer was at or below 500 µS/cm. This centrifuged product was then dried at 100 to 120° C. for 2-16 hrs. This dried product was used for formulation evaluations. A substantially flocculant-free crystalline product, as used herein, refers to a crystalline product that contains less than 100 ppm, preferably less than 50 ppm, more preferably less than 20 ppm, and most preferably less than 10 ppm of a flocculant.

Formulation

A standard formulation protocol called for making a 45% solids, consisting of 45% molecular sieve, 13.5% binder, $Al_2O_3$-derived from aluminum chlorohydrate (ACH), and 41.5% kaolin clay. The sequence of material addition was (1) adding ACH powder or ACH solution to de-ionized water; (2) adding the molecular sieve to the diluted ACH solution of (1) while mixing using a Yamato homogenizer LR400D (from Yamato Scientific America Inc., Orangeburg, N.Y.) at 600-800 RPM; then mixing using a Silverson high-shear mixer L4RT-A (from Silverson Machines, Inc., East Longmeadow, Mass.) at 6000 RPM for 3 minutes; (3) adding kaolin clay (Ultrafine from Engelhard, Iselin, N.J.) to the above mixture while mixing using a Yamato homogenizer at 600-800 RPM; then mixing using a Silverson high-shear mixer L4RT-A (from Silverson Machines, Inc., East Longmeadow, Mass.) at 6000 RPM for 3 minutes. Finally, the slurry was milled using a Silverson high-shear in-line mixer at 6,000-7,500 RPM for 60 passes. The milled slurry was then cooled down to 23° C. for viscosity characterization. Viscosity measurements were taken using a Brookfield DV-II+Pro viscometer (from Brookfield Engineering Laboratories, Inc., Middleboro, Mass.) using a #6 spindle at 23-24° C.

Flocculation Experiment Setup and Settling Rate Measurement

A slurry sample removed from the crystallizer that was kept at crystallization conditions, i.e., 165° C., was cooled down to room temperature before flocculation experiments were carried out. This slurry contained 22% crystalline product. Settling experiments were conducted using a 500 cc graduated cylinder, Kimax®, from Kimble Glass Inc., Vineland, N.J. Its dimensions were: inner diameter, 24.1 mm; and total height, 360 mm. Unless otherwise stated, flocculation was conducted to achieve a total dilution ratio of 100 cc of slurry and 300 cc of water plus flocculant solution.

Typically, an amount of 100 cc of sample slurry was added to the Kimax® cylinder, then diluted with 100-300 cc of de-ionized water plus flocculant solution. Each time a liquid was added the entire content in the cylinder was mixed by shaking the cylinder vigorously while flipping the cylinder upside down 3 to 6 times. Once the flocculant was added and the dilution ratio achieved, the cylinder was left on a counter top for settling. Under flocculation conditions, the solid-rich phase settled to the bottom while the top-layer became clearer or solid-deficient. In most cases, a clear phase boundary was easily identified. The settling rate was defined as percent of volume settled (top clear layer) in total volume per hour. For example, in a flocculation experiment where 250 cc volume was settled out of a 500 cc total volume in 120 minutes, the measured settling rate would be (250/500/120*60*100)=25 vol. %/hr. The higher the settling rate the faster the flocculated system settled.

Filtration Set-up

Commercial filtration can be achieved by, e.g., filterpressing, a process where a filtercake is formed on a filtering medium, for instance, filter cloth on a support, then pressure is applied to force excess water or liquid out of the filtercake. In order to mimic the commercial process in a laboratory setting, a Buchner funnel was chosen as the filtration vessel and support. The Buchner funnel had a flat bottom and a diameter of 185 mm having holes of 2 mm. A #542 hardened ashless filter paper from Whatman (from Whatman Inc., Clifton, N.J.) was used for filtration. The flask where the Buchner funnel was mounted was pulled by vacuum. The quality of filtration was judged based on the speed of filtration (amount of liquid coming out of the filter per unit time) and the clarity of the filtrate. The faster the filtration, the clearer the filtrate was.

Example 1

Example 1 was prepared by (1) adding 15,000 g of the AEI/CHE SAPO intergrowth slurry composition described above (solids content 22 wt. %), after being cooled down to room temperature, to a settling vessel that held at least 60 liters of liquid; (2) adding 990 g of 2 wt. % Cytec Superfloc C-591 (made from C-591 calculated based on actual level of C-591 in commercial product from Cytec Industries Inc., West Paterson, N.J.) while under mixing at 200-500 RPM, then for 5 minutes after completely adding the flocculant; (3) adding 1980 g of 1 wt. % Cytec Superfloc C-577 (calculated based on the actual concentration of C-577 in the C-577 product from Cytec Industries Inc., West Paterson, N.J.) to the above mixture while under mixing at 200-500 RPM, then mixing for 5 minutes after completely adding the flocculant; (4) adding 33,000 g of de-ionized water to the above mixture while under mixing at 200-500 RPM, then mixing for 5 minutes after completely adding the de-ionized water. This resulted in a slurry that contained 6000 ppm of C-591 and 6000 ppm of C-577 on the molecular sieve. Superfloc C-591 is a polyquaternary ammonium resin while Superfloc C-577 is a polyquaternary amine in water. Their corresponding molecular weights are 300,000 and 1,000,000, respectively. The slurry was allowed to settle overnight before decanting the top layer and sending the settled content to a filterpress for filtration and washing. The content of the filterpress was washed using de-ionized water until the conductivity of the filtrate was at or below 500 µS/cm. This washed filtercake was left on the filterpress for additional drying by passing air through it.

Example 2

Example 2 was prepared by (1) adding 55,000 g of the AEI/CHE SAPO intergrowth slurry composition described above (solids content 22 wt. %), after being cooled down to room temperature, to a settling vessel that held at least 100 liters of liquid; (2) adding 9990 g of 0.5 wt. % Cat Floc L solution (made from Cat Floc L, calculated based on the actual level Cat Floc L in the commercial product from Nalco Chemical Inc., Sugarland, Tex.) while under mixing at 200-500 RPM, then for 5 minutes upon complete addition of the flocculant; (3) adding 1000 g of 0.28 wt. % Cytec Superfloc C-1555 (calculated based on the actual concentration of C-1555 in the C-1555 product from Cytec Industries Inc., West Paterson, N.J.) to the above mixture while mixing at 200-500 RPM, then mixing for 5 minutes after completely adding the flocculant; (4) adding 33,000 g of de-ionized water to the above mixture while mixing at 200-500 RPM, then mixing for 5 minutes after addition of all of the de-ionized water. This resulted in a slurry that contained 9000 ppm of Cat Floc L and 700 ppm of C-1555 on the molecular sieve. Cat Floc L is a cationic high molecular weight diallyldimethyl ammonium chloride (DADMAC) polymer. Superfloc C-1555 is a cationic polyacrylamide having a molecular weight of 6,000,000. The slurry was allowed to settle overnight before decanting the top layer and sending the settled content to a filterpress for filtration and washing. The content of the filterpress was washed using de-ionized water to the point that conductivity of the filtrate was at or below 500 µS/cm. This washed filtercake was left on the filterpress for additional drying by passing air through it.

Example 3

The filtercake sieve produced in Example 1 was formulated according to the standard formulation protocol. This sieve had a solid content of 47.58%. The slurry was made by (1) adding 488 g of a commercial aluminum chlorohydrate solution (from Reheis Chemical Inc., Berkeley Heights, N.J., solid content: 24.9%) to 219 g of de-ionized water, then mixing using a Yamato LR400D homogenizer (from Yamato Scientific America Inc., Orangeburg, N.Y.) at 700 RPM for 5 minutes; (2) adding 851.2 g of the filtercake sieve while mixing using a Yamato LR400D homogenizer (from Yamato Scientific America Inc., Orangeburg, N.Y.) at 700 RPM for 10 minutes, then mixing using a Silverson high-shear mixer L4RT-A (from Silverson Machines, Inc., East Longmeadow, Mass.) at 6000 RPM for 3 minutes; and (3) adding 441.8 g of Engelhard Ultrafine kaolin clay (solid content: 84.54%) while mixing using a Yamato homogenizer at 700 RPM for 10 minutes. The slurry produced was then milled using a Silverson high-shear in-line mixer at 7500 ppm for 60 passes. This resulted in a slurry having a solid content of 44.93%, pH of 3.95 and viscosity of 13,900 cPs at 10 RPM. The slurry was spray dried using a Yamato DL-41 spray dryer at 350° C. inlet temperature to produce a spray dried product. After calcination at 650° C. for 2 hrs, the spray dried product gave an ARI of 0.90%/hr and ABD of 0.81 g/cc.

Example 4

The filtercake sieve produced in Example 2 was formulated according to the standard formulation protocol. This sieve had a solid content of 74.03%. The slurry was made by (1) adding 488 g a commercial aluminum chlorohydrate solution (from Reheis Chemical Inc., Berkeley Heights, N.J., solid content: 24.9%) to 523.2 g of de-ionized water, then mixing using a Yamato LR400D homogenizer (from Yamato Scientific America Inc., Orangeburg, N.Y.) at 700 RPM for 5 minutes; (2) adding 547.1 g of the filtercake sieve while mixing using a Yamato LR400D homogenizer (from Yamato Scientific America Inc., Orangeburg, N.Y.) at 700 RPM for 10 minutes, then mixing using a Silverson high-shear mixer L4RT-A (from Silverson Machines, Inc., East Longmeadow, Mass.) at 6000 RPM for 3 minutes; and (3) adding 441.8 g of Engelhard Ultrafine kaolin clay (solid content: 84.54%) while mixing using a Yamato homogenizer at 700 RPM for 10 minutes. The slurry produced was then milled using a Silverson high-shear in-line mixer at 7500 ppm for 60 passes. This resulted in a slurry having a solid content of 44.93%, pH of 3.9 and viscosity of 4,300 cPs at 10 RPM. The slurry was spray dried using a Yamato DL-41 spray dryer at 350° C. in-let temperature to produce a spray dried product. After calcination at 650° C. for 2 hrs, the spray dried product gave an ARI of 0.42%/hr and ABD of 0.81 g/cc.

Example 5

The filtercake sieve (substantially flocculant-free crystalline product) was produced by centrifuge, washing, and drying at 120° C. This sieve had a solid content of 84.54%. The slurry was made by (1) adding 488 g a commercial aluminum chlorohydrate solution (from Reheis Chemical Inc., Berkeley Heights, N.J., solid content: 24.9%) to 578.5 g of de-ionized water, then mixing using a Yamato LR400D homogenizer (from Yamato Scientific America Inc., Orangeburg, N.Y.) at 700 RPM for 5 minutes; (2) adding 491.7 g of the filtercake sieve while mixing using a Yamato LR400D homogenizer (from Yamato Scientific America Inc., Orangeburg, N.Y.) at 700 RPM for 10 minutes, then mixing using a Silverson high-shear mixer L4RT-A (from Silverson Machines, Inc., East Longmeadow, Mass.) at 6000 RPM for 3 minutes; and (3) adding 441.8 g of Engelhard Ultrafine kaolin clay (solid content: 84.54%) while mixing using a Yamato homogenizer at 700 RPM for 10 minutes. The slurry produced was then milled using a Silverson high-shear in-line mixer at 7500 ppm for 60 passes. This resulted in a slurry having a solid content of 44.97%, pH of 3.82 and viscosity of 1,300 cPs at 10 RPM. The slurry was spray dried using a Yamato DL-41 spray dryer at 350° C. in-let temperature to produce a spray dried product. After calcination at 650° C. for 2 hrs, the spray dried product gave an ARI of 0.35%/hr and ABD of 0.86 g/cc.

Examples 6, 7, and 8

To the slurry produced in Example-5, various amounts of flocculant or flocculants were added. This was done by adding various amount of 2% Cytec Superfloc C-591 solution and 1% Cytec Superfloc C-577 solution to achieve 9000 ppm of C-591 and different levels of C-577, i.e., 2000 ppm (Example 6), 4000 ppm (Example 7) and 6000 ppm (Example 8). Their corresponding viscosities measured at 10 RPM were 3600 cPs, 9800 cPs, and 13700 cPs. For visualization, the relationship between slurry viscosity and flocculant C-577 level and a constant C-591 level (9000 ppm) is given in FIG. 1. From the results of FIG. 1, in order to maintain slurry viscosity at or below 7000 cPs, the amount of C-577 that can be added during flocculation should stay at or below 2900 ppm. If one desires a lower slurry viscosity, e.g., 4000 cPs, the level of Superfloc C-577 should stay around 2000 ppm. FIG. 1 is a plot demonstrating the impact of flocculant, Cytec Superfloc C-577 on slurry viscosity (45% solids, 45% molecular sieve, 13.5% ACH derived alumina, and 41.5% kaolin clay) at 9000 ppm of Cytec Superfloc C-591 and various levels of Cytec Superfloc C-577.

Table 1, below, demonstrates the varying viscosities and processability of the various formulations.

TABLE 1

Summary of impact of flocculant level on slurry viscosity

| Ex. | Flocculant Loadings | Viscosity (cP) @ 10 RPM | Comments |
|---|---|---|---|
| Ex. 3 | C-591/C-577: 6000 ppm/6000 ppm | 13,900 | difficult to process/spray dry |
| Ex. 4 | Cat Floc L/C-1555: 9000 ppm/700 ppm | 4,300 | good processability |
| Ex. 5 | No Flocculant: 0 ppm | 1,300 | good processability |
| Ex. 6 | C-591/C-577: 9000 ppm/2000 ppm | 3,600 | good processability |

Without being limited to any one theory, the method of quantifying the effective amount of flocculant necessary to recover a molecular sieve crystalline product can be used for any flocculant or molecular sieve. But varying flocculants and molecular sieves will result in different relationships, such as the relationship illustrated in FIG. 1.

Example 9

Figure 2:
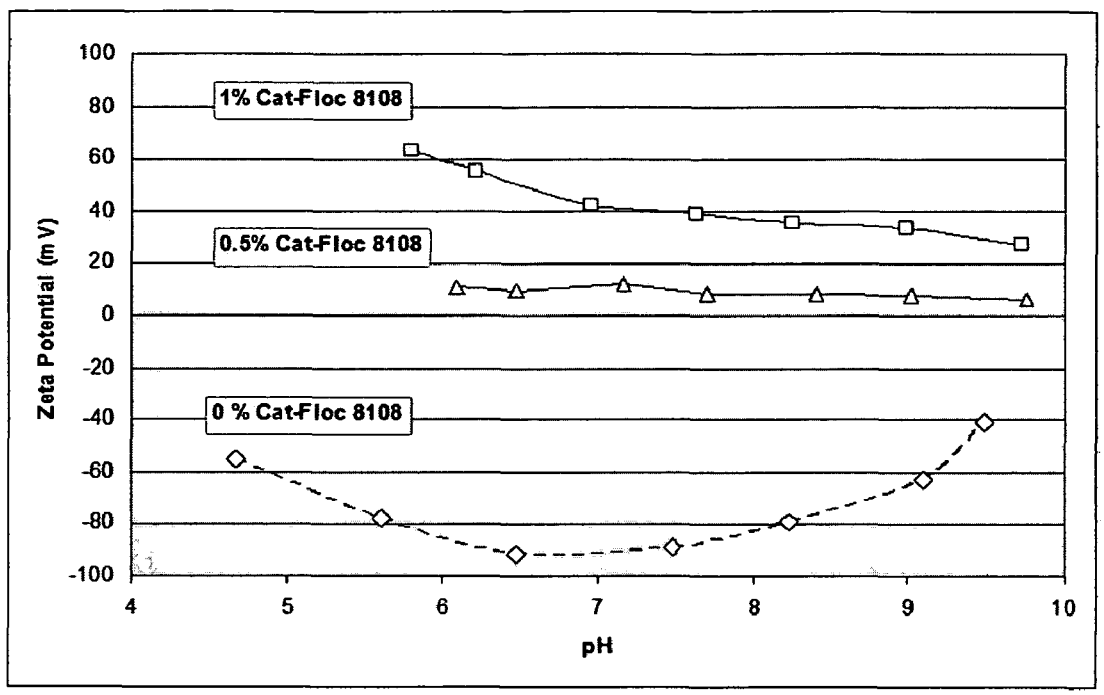
FIG. 2 is a graph plotting surface charge against pH for a slurry of a SAPO intergrowth without the addition of flocculant and after the addition of 0.5 wt % and 1 wt % of Cat Floc 8108 cationic flocculant.

The crystallization product produced from an AEI/CHE SAPO intergrowth synthesis was recovered by centrifuging and was then washed with water and dried at 110° C. A slurry containing 5% wt of the crystalline product was made by dispersing the dried product in de-ionized water and the zeta potential of the molecular sieve was determined at various slurry pH values. The results are shown in FIG. 2.

Example 10

A slurry was prepared by dispersing the dried product used in Example 9 in de-ionized water together with Cat Floc 8108 cationic flocculant obtained from Nalco Chemical Co., Sugar Land, Tex. The slurry contained 5% wt of the molecular sieve and 5,000 ppm of the flocculant based on the molecular sieve. The zeta potential of the molecular sieve was determined at various slurry pH values and the results are shown in FIG. 2.

Example 11

The procedure of Example 10 was repeated but with the amount of the Cat Floc 8108 cationic flocculant being increases so that the slurry contained 10,000 ppm of the flocculant based on the molecular sieve. The zeta potential of the molecular sieve was determined at various slurry pH values and the results are shown in FIG. 2.

It will be seen from FIG. 2 that the SAPO intergrowth, without flocculant, had a large negative surface charge, but adding 5,000 ppm of the Cat Floc 8108 cationic flocculant turned the surface charge from highly negative to slightly positive. Moreover the surface charge characteristics were little changed by variation in pH within the pH range of 6.1 to 9.8. When 10,000 ppm of the Cat Floc 8108 cationic flocculant was added, the surface of the molecular sieve became more positively charged.

It will be appreciated that, although the surface of the molecular sieve in Example 10 was positively charged, its zeta potential was small (<12 mV) and hence the slurry was not stable and was susceptible to flocculation.

While the present invention has been described and illustrated by reference to particular embodiments, those of ordinary skill in the art will appreciate that the invention lends itself to variations not necessarily illustrated herein. For example, it is contemplated that one or more molecular sieves are reverable in the presence of one or more flocculants. For this reason, then, reference should be made solely to the appended claims for purposes of determining the true scope of the present invention.

What is claimed is:

1. A process for producing one or more olefin(s), the process comprising:
    (a) preparing a molecular sieve product mixture, the molecular sieve product mixture comprising the molecular sieve crystalline product, and a binder;
    (b) separating the molecular sieve product mixture into a plurality of samples;
    (c) mixing at least two of the plurality of samples with a quantity of flocculant to produce a plurality of flocculated samples, wherein at least two of the plurality of flocculated samples have a different ratio of flocculant to molecular sieve crystalline product mixture;
    (d) measuring the viscosity of at least two of the plurality of flocculated samples having a different ratio of flocculant to molecular sieve crystalline product mixture;
    (e) establishing a relationship between the quantity of flocculant and the viscosity measurements; and
    (f) determining from the relationship the amount of flocculant effective to recover the molecular sieve crystalline product resulting in a processable molecular sieve crystalline product having the general formula mR:(Si$_x$Al$_y$P$_z$)O$_2$ wherein wherein R represents at least one templating agent, preferably an organic templating agent; m is the number of moles of R per mole of (Si$_x$Al$_y$P$_z$)O$_2$; and m is greater than 0.1 to 1, x is greater than 0 to about 0.25, y is in the range of from 0.4 to 0.5, and z is in the range of from 0.25 to 0.5; wherein the processable molecular sieve crystalline product forms a molecular sieve slurry having a viscosity of less than about 10,000 cps; further comprising adjusting the determined amount of flocculant effective to recover the molecular sieve crystalline product by a correction factor of from about 0.75 to about 0.98;
    (g) formulating the crystalline product into a molecular sieve catalyst;
    (h) introducing a feedstock comprising one or more oxygenates to a reactor system in the presence of the molecular sieve catalyst;
    (i) withdrawing from the reactor system an effluent stream; and
    (j) passing the effluent stream through a recovery system recovering the one or more olefin(s).

2. The process of claim 1 and further comprising:
    passing a hydrocarbon feedstock to a syngas production zone to produce a synthesis gas stream; and
    contacting the synthesis gas stream with a catalyst to form the feedstock comprising the one or more oxygenates.

3. The process of claim 1, wherein the process further comprises the step of: polymerizing the one or more olefins) in the presence of a polymerization catalyst into a polyolefin.

4. The process of claim 1, wherein the one or more olefin(s) include ethylene and propylene.

5. The process of claim 1, wherein the feedstock comprising one or more oxygenates comprises methanol.

6. A process for producing one or more olefin(s), the process comprising:
    (a) synthesizing a molecular sieve crystalline product synthesis mixture, the synthesis mixture comprising an aluminum source, and a silicon source;
    (b) recovering the molecular sieve crystalline product from the molecular sieve crystalline product synthesis mixture by a recovery means selected from the group consisting of centrifugation, filtration, filterpressing, washing, settling, and any other means of mechanically enhancing separation;

(c) preparing a molecular sieve product mixture, the molecular sieve product mixture comprising the molecular sieve crystalline product, and a binder;

(d) separating the molecular sieve product mixture into a plurality of samples;

(e) mixing at least two of the plurality of samples with a quantity of flocculant to produce a plurality of flocculated samples, wherein at least two of the plurality of flocculated samples have a different ratio of flocculant to molecular sieve crystalline product mixture;

(f) measuring the viscosity of at least two of the plurality of flocculated samples having a different ratio of flocculant to molecular sieve crystalline product mixture;

(g) establishing a relationship between the quantity of flocculant and the viscosity measurements;

(h) determining from the relationship the amount of flocculant effective to recover the molecular sieve crystalline product resulting in a processable molecular sieve crystalline product and choosing a processable molecular sieve that forms a molecular sieve slurry having a viscosity of less than about 10,000 cps; then forming the crystalline product into a molecular sieve catalyst; the amount of flocculant effective to recover the molecular sieve crystalline product is determined by the above methods to be from about 20 ppm to about 10 wt % flocculant based on expected solid molecular sieve product yield and the amount of flocculant is selected so that, after flocculant addition, the zeta potential is within the range of about +30 mV to about −30 mV; further comprising adjusting the determined amount of flocculant effective to recover the molecular sieve crystalline product by a correction factor of from about 0.75 to about 0.98;

(i) formulating the processable molecular sieve crystalline product into a molecular sieve catalyst; and (j) contacting a feedstock comprising one or more oxygenates with the molecular sieve catalyst under conditions to convert the feedstock to one or more olefin(s).

7. The method of claim 1, wherein the molecular sieve product mixture further comprises a matrix material.

8. The method of claim 1, wherein the molecular sieve crystalline product is prepared by the steps comprising:

synthesizing a molecular sieve crystalline product synthesis mixture, the synthesis mixture comprising an aluminum source and a silicon source; and recovering the molecular sieve crystalline product from the molecular sieve crystalline product synthesis mixture by a recovery means selected from the group consisting of centrifugation, filtration, filterpressing, washing, settling, and any other means of mechanically enhancing separation.

9. The method of claim 8, wherein the synthesis mixture further comprises a phosphorus source.

10. The method of claim 1 and comprising measuring the viscosity of one of the plurality of samples, the sample being substantially flocculant-free.

11. The method of claim 1 and further comprising scaling the determined amount of flocculant effective to recover the molecular sieve crystalline product to produce about 5,000 kg of the processable molecular sieve crystalline product.

12. The method of claim 1, wherein the molecular sieve crystalline product has a debris factor of less than about 0.2.

13. The method of claim 1, wherein the flocculant has an average molecular weight of about 500 to about 50,000,000.

14. The method of claim 1, wherein the binder is selected from one or more of the group consisting of aluminum chlorohydrate, aluminum hydroxy chloride, aluminum zirconium chlorohydrate, aluminum sol, silica sol, aluminum silica sol, or a combination thereof.

15. The method of claim 7, wherein the matrix material is selected from one or more of the group consisting of kaolin clay, chemically treated kaolin clay, metal oxides selected from $M_2O_3$, $SiO_2$, or other sinter resistant metal oxides.

16. The method of claim 1 wherein the relationship is established by a computer.

17. The method of claim 1, wherein the amount of flocculant effective to recover the molecular sieve crystalline product is from about 20 ppm to about 10 wt % flocculant based on expected solid molecular sieve product yield.

18. The method of claim 1, wherein the molecular sieve crystalline product is recovered at a recovery rate of from about 0.5 kg/hr to about 5,000 kg/hr.

19. The method of claim 18, wherein the recovery rate is increased by about 0.5 kg/hr to about 5 kg/hr by using the effective amount of flocculant in combination with the recovery means selected from the group consisting of centrifugation, filtration, filterpressing, washing, settling, and any other means of mechanically enhancing separation.

* * * * *